(12) United States Patent
Hayakawa et al.

(10) Patent No.: US 11,835,456 B2
(45) Date of Patent: Dec. 5, 2023

(54) SUBSTANCE IDENTIFICATION DEVICE, SUBSTANCE IDENTIFICATION METHOD AND SUBSTANCE IDENTIFICATION PROGRAM

(71) Applicant: The University of Tokyo, Tokyo (JP)

(72) Inventors: Tomohiko Hayakawa, Tokyo (JP); Masatoshi Ishikawa, Tokyo (JP); Norimasa Kishi, Tokyo (JP); Haruka Ikeda, Tokyo (JP)

(73) Assignee: The University of Tokyo, Tokyo (JP)

( * ) Notice: Subject to any disclaimer, the term of this patent is extended or adjusted under 35 U.S.C. 154(b) by 448 days.

(21) Appl. No.: 17/277,558

(22) PCT Filed: Sep. 18, 2019

(86) PCT No.: PCT/JP2019/036448
§ 371 (c)(1),
(2) Date: Apr. 16, 2021

(87) PCT Pub. No.: WO2020/059727
PCT Pub. Date: Mar. 26, 2020

(65) Prior Publication Data
US 2022/0034809 A1  Feb. 3, 2022

(30) Foreign Application Priority Data
Sep. 18, 2018 (JP) .................. 2018-173837

(51) Int. Cl.
*G01N 21/64* (2006.01)
*G06N 20/00* (2019.01)

(52) U.S. Cl.
CPC ..... *G01N 21/6408* (2013.01); *G01N 21/6402* (2013.01); *G01N 21/6456* (2013.01); *G06N 20/00* (2019.01); *G01N 2201/06113* (2013.01)

(58) Field of Classification Search
CPC .......... G01N 21/6402; G01N 21/6408; G01N 21/6456; G01N 2201/06113; G06N 20/00
See application file for complete search history.

(56) References Cited

U.S. PATENT DOCUMENTS

| | | |
|---|---|---|
| 2004/0031931 A1 | 2/2004 | Mueller et al. |
| 2007/0224659 A1 | 9/2007 | Katsumata et al. |

(Continued)

FOREIGN PATENT DOCUMENTS

| | | |
|---|---|---|
| JP | 2004301638 A | 10/2004 |
| JP | 2010164468 A | 7/2010 |

(Continued)

OTHER PUBLICATIONS

Spring 2016 Scientific Cameras, Hamamatsu Photonics K.K., 2016, pp. 1-19, https://hamamatsu.su/media/index/?type=catalog&id=61.

(Continued)

*Primary Examiner* — Mark R Gaworecki
(74) *Attorney, Agent, or Firm* — Procopio, Cory, Hargreaves & Savitch LLP

(57) ABSTRACT

A substance identification device, a substance identification method and a substance identification program that can identify substances with high accuracy by means of light are provided. A substance identification device 10 includes a setting unit 11 that sets an irradiation condition of excitation light, an irradiation unit 12 that irradiates an object 100 with the excitation light under the irradiation condition, a measurement unit 13 that measures emission data for delayed fluorescence or phosphorescence of the object 100 which occurs in response to the irradiation with the excitation light, and an identification unit 15 that identifies a substance constituting the object based on the emission data and emission data for delayed fluorescence or phosphorescence which are measured when a plurality of substances are each (Continued)

irradiated with the excitation light under the irradiation condition.

17 Claims, 26 Drawing Sheets

(56) References Cited

U.S. PATENT DOCUMENTS

| | | |
|---|---|---|
| 2010/0003715 A1 | 1/2010 | Pellegrino |
| 2011/0266458 A1 | 11/2011 | Nakao et al. |
| 2017/0027110 A1 | 2/2017 | Ito et al. |
| 2017/0038299 A1* | 2/2017 | Long .................. G01N 21/6408 |
| 2017/0276545 A1 | 9/2017 | Henriksson |
| 2018/0199409 A1 | 7/2018 | Waag et al. |

FOREIGN PATENT DOCUMENTS

| | | |
|---|---|---|
| JP | 2015195786 A | 11/2015 |
| WO | 2005062027 A1 | 7/2005 |
| WO | 2009/081168 A | 7/2009 |
| WO | 2015037643 A1 | 3/2015 |

OTHER PUBLICATIONS

Press Release for a New CMOS InGaAs Near Infrared Multispectral Camera for Scientific-use, Ad Science Inc., Optronics Online, Sep. 6, 2013, https://optronicsmedia. com/news/20130906/12517/.

Matteo Perenzoni nad Leonardo Gasparini, A 160 × 120 Pixel Analog-Counting Single-Photon Imager With Time-Gating and Self-Referenced Column-Parallel A/D Conversion for Fluorescence Lifetime Imaging, IEEE Journal of solid-state circuits, Dec. 30, 2015, vol. 51, No. 1, pp. 155-167, doi: 10.1109/JJSSC.2015. 2482497.

* cited by examiner

[Figure 1]
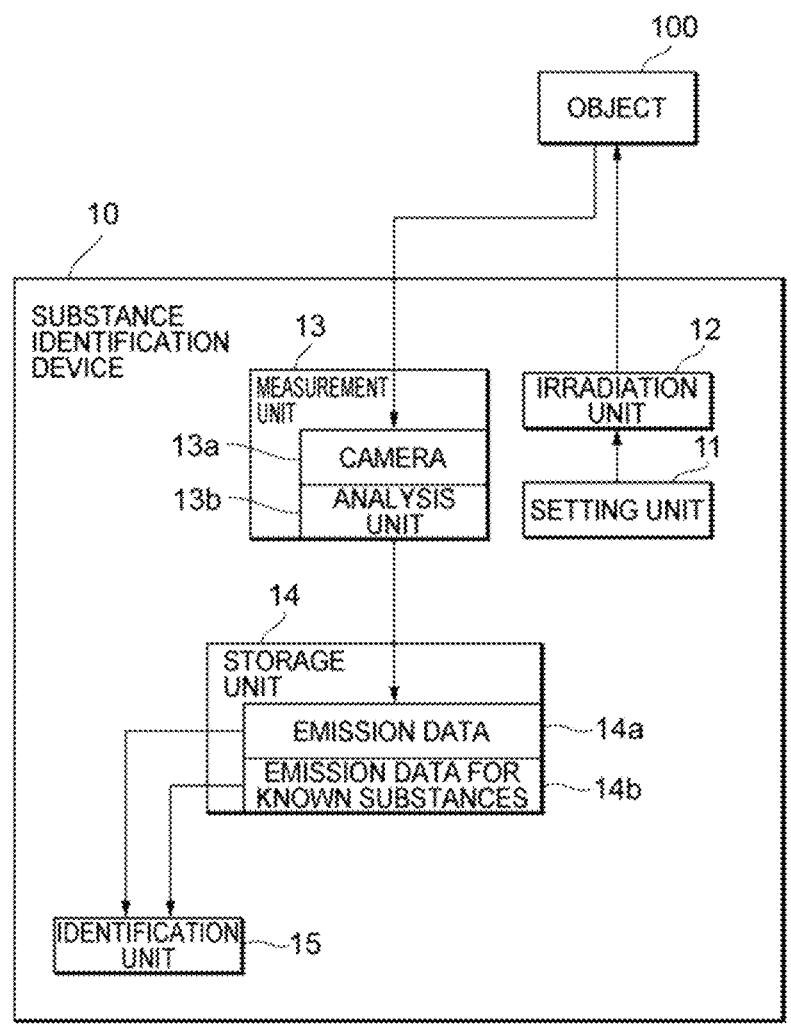

[Figure 2]
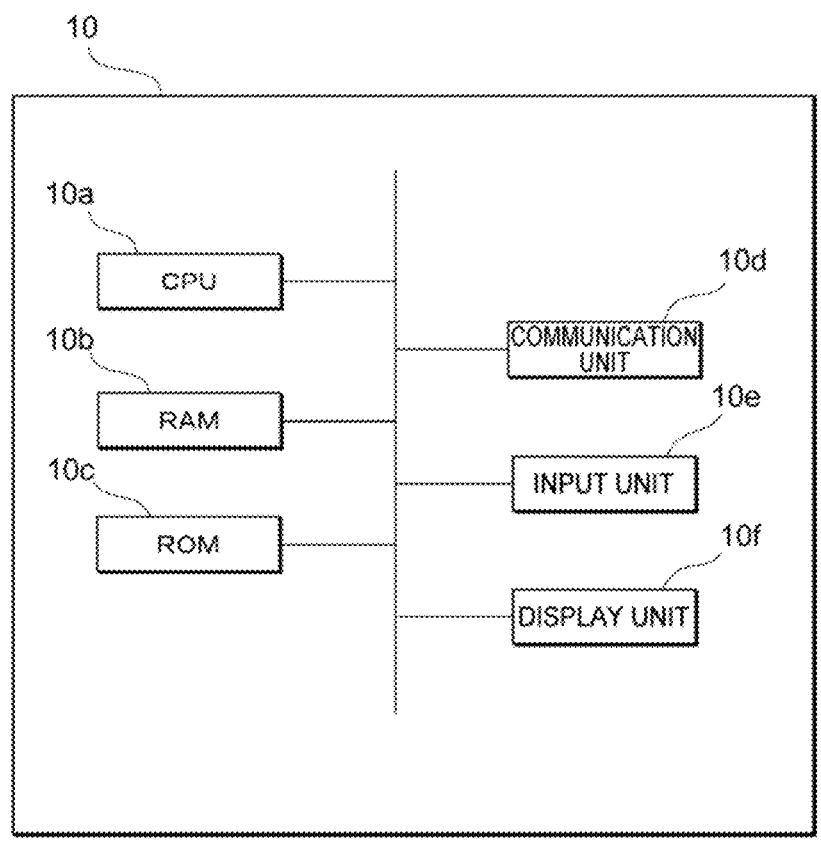

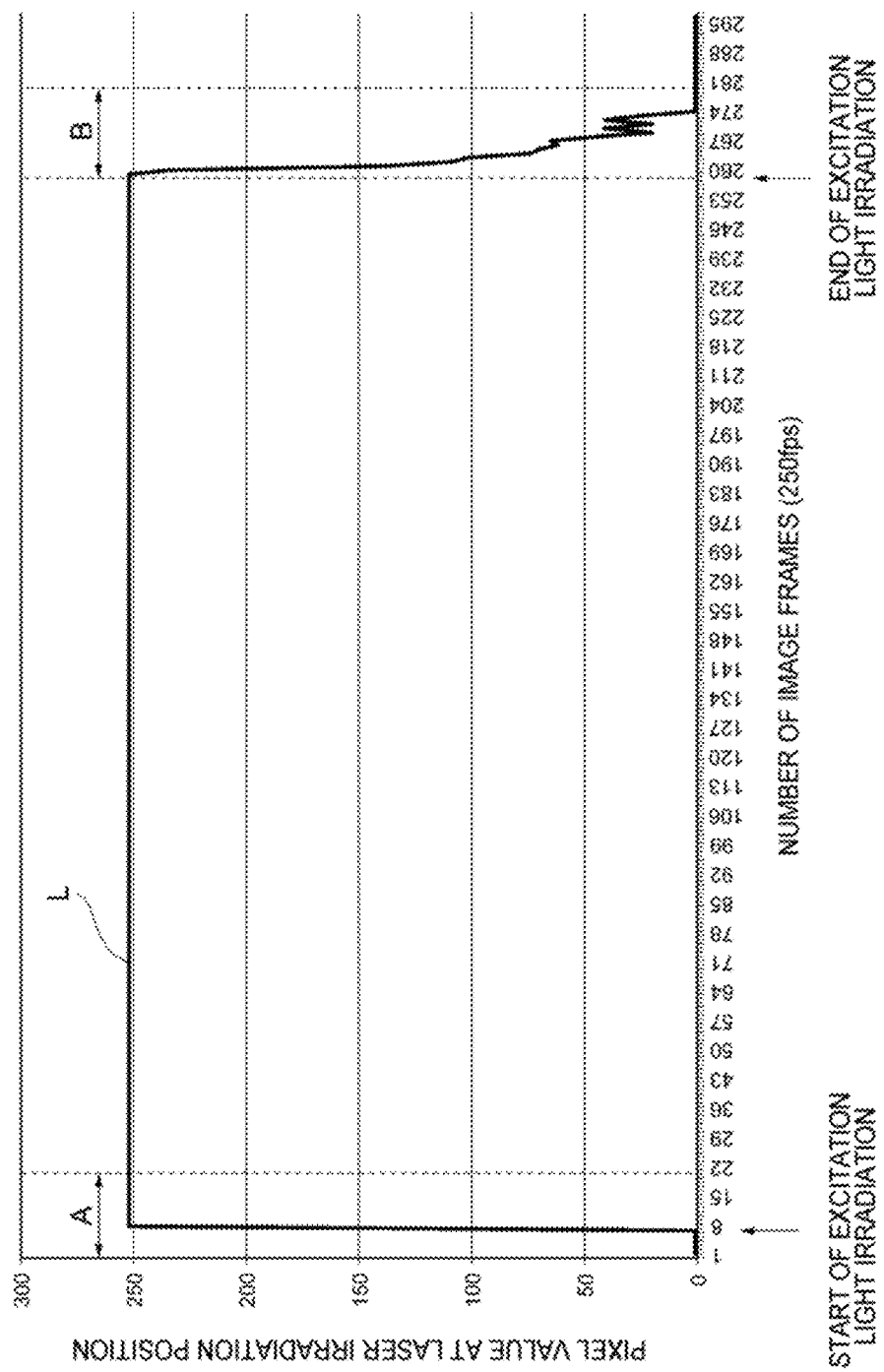
[Figure 3]

[Figure 4]
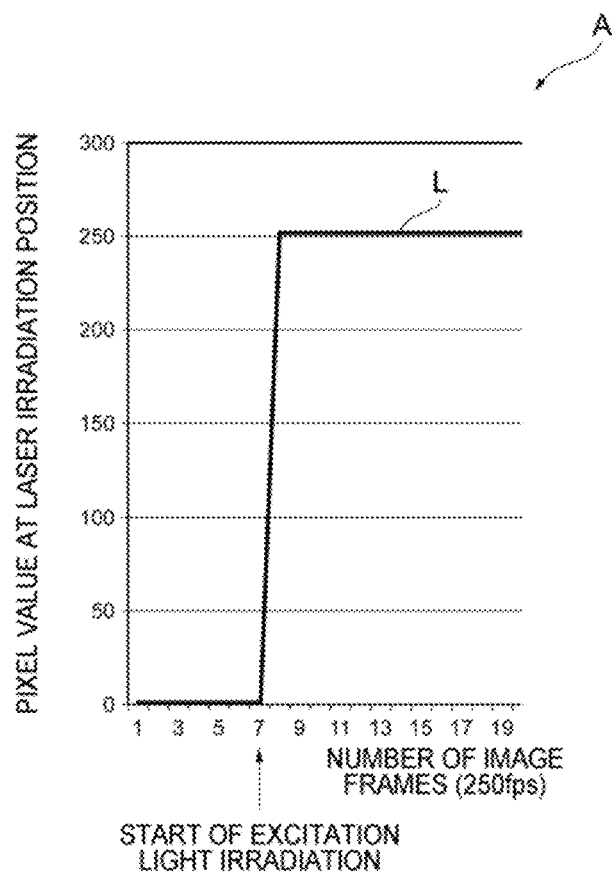

[Figure 5]
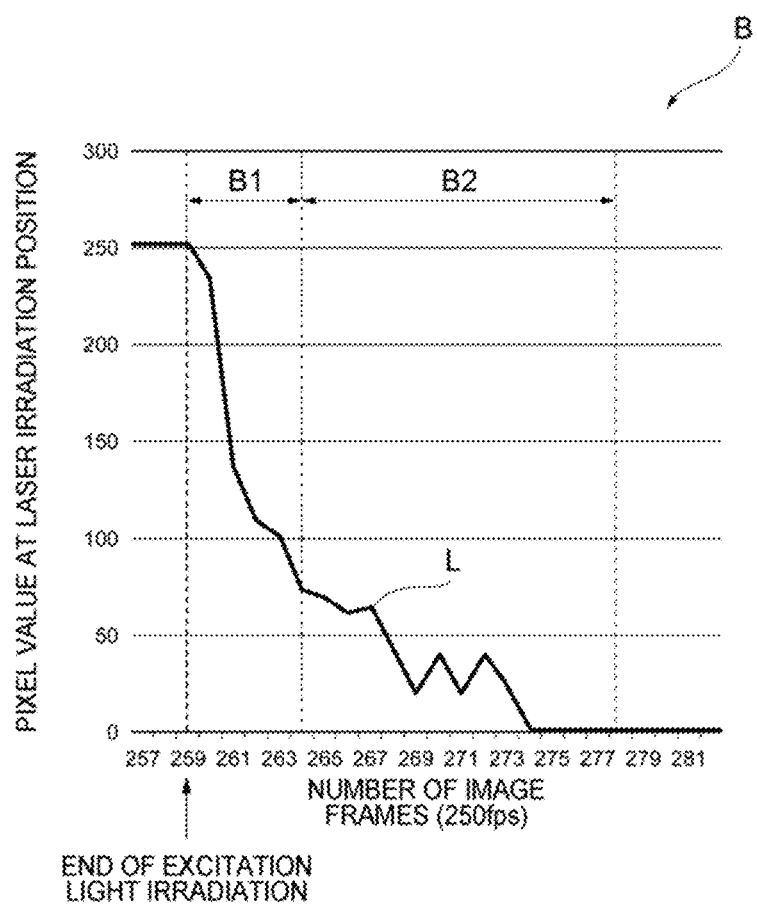

[Figure 6]
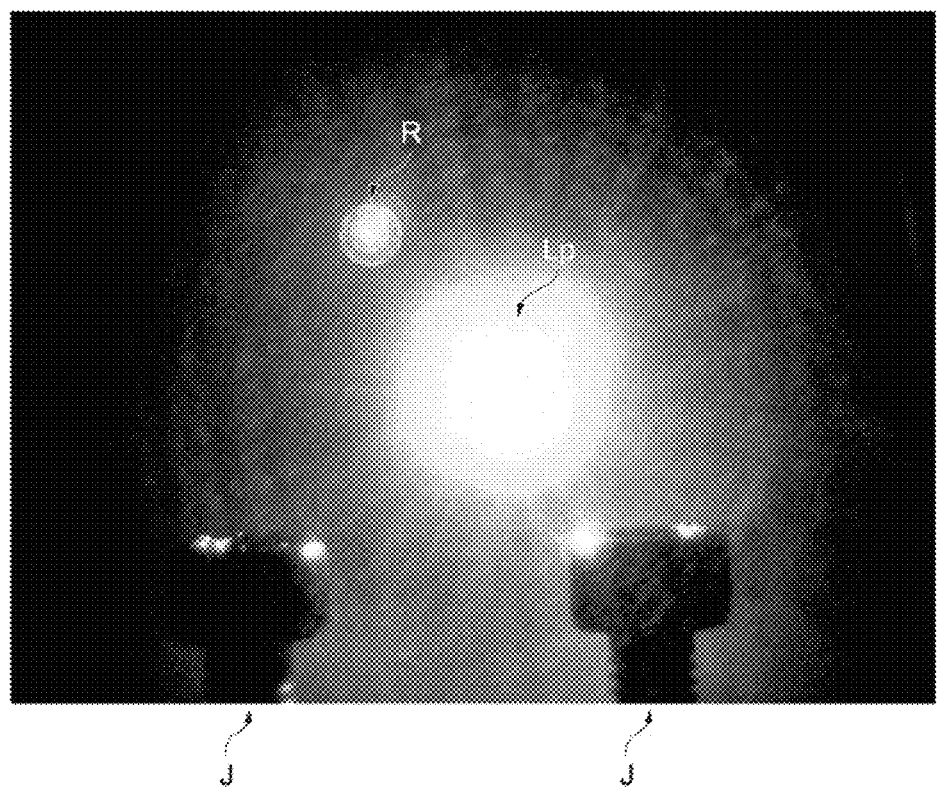

[Figure 7]
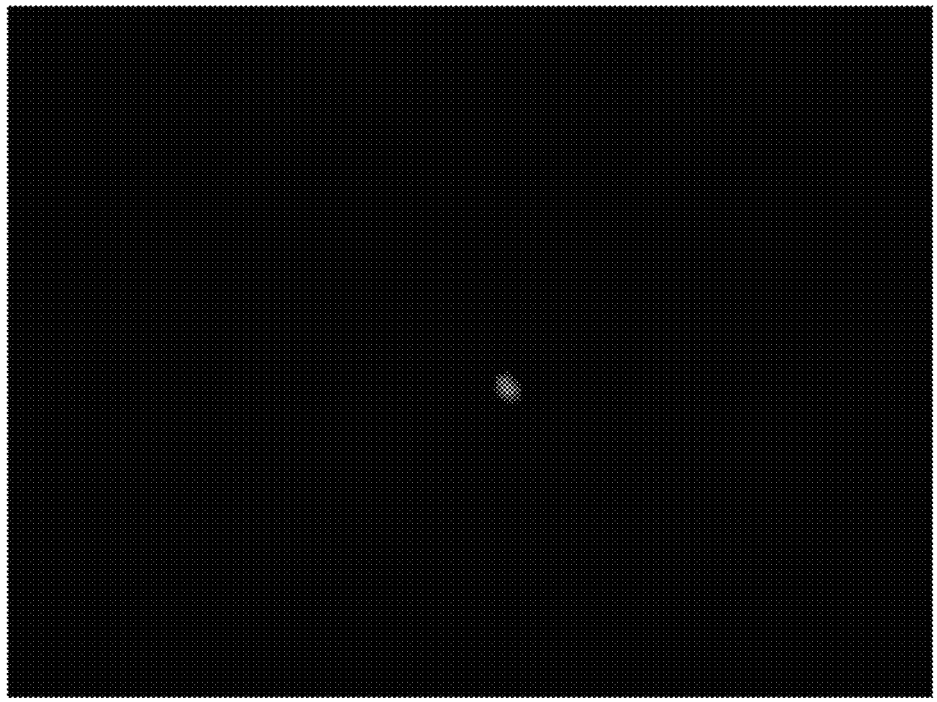

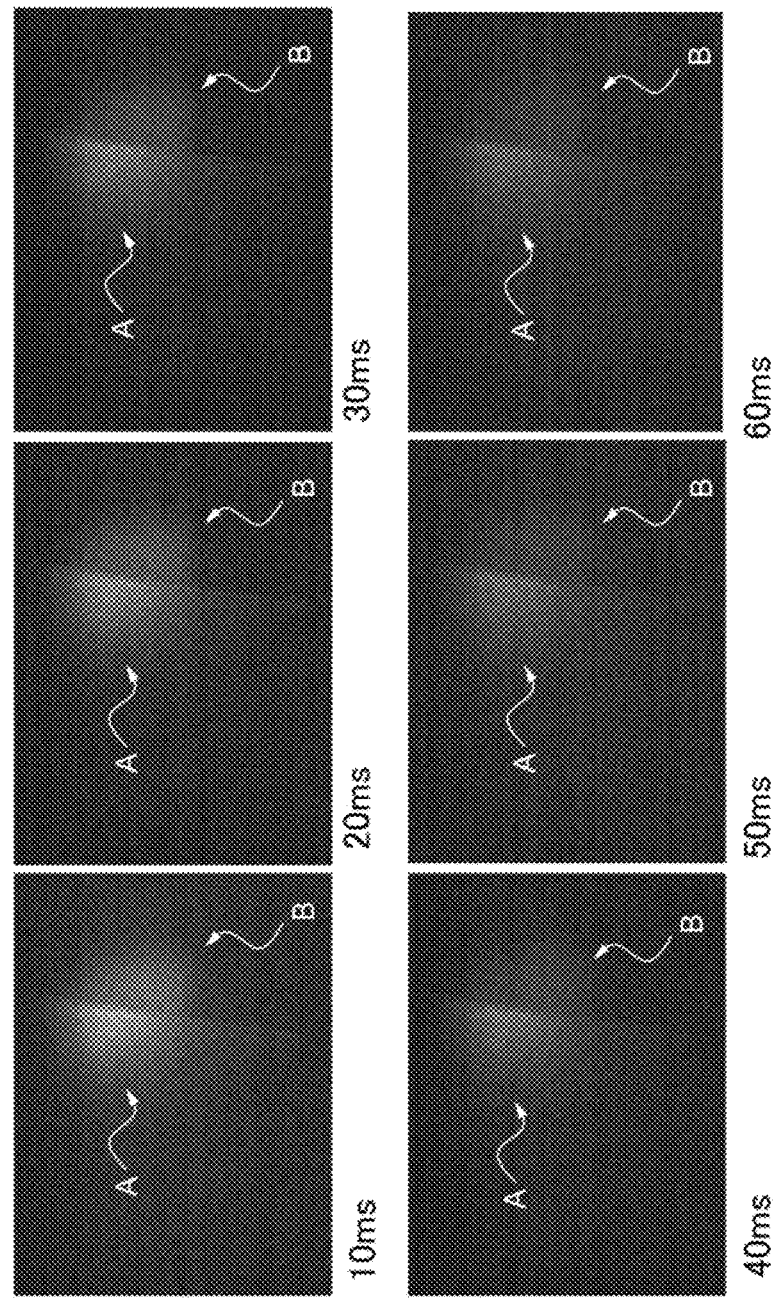
[Figure 8]

[Figure 9]
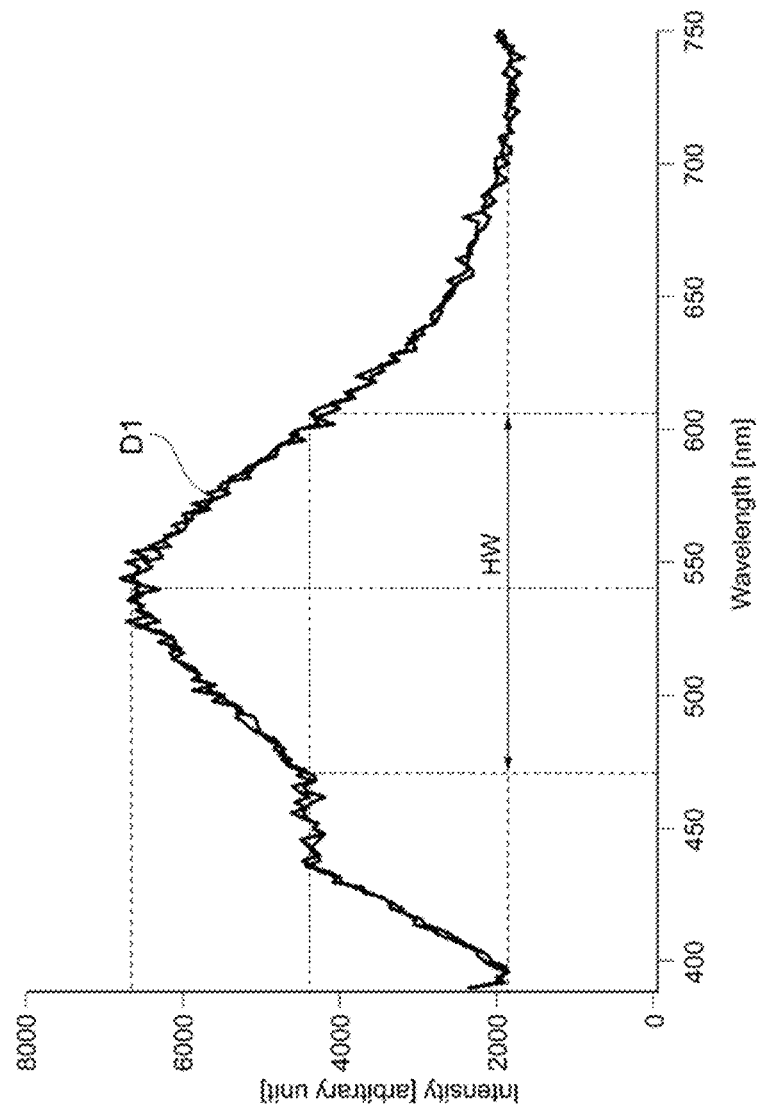

[Figure 10]
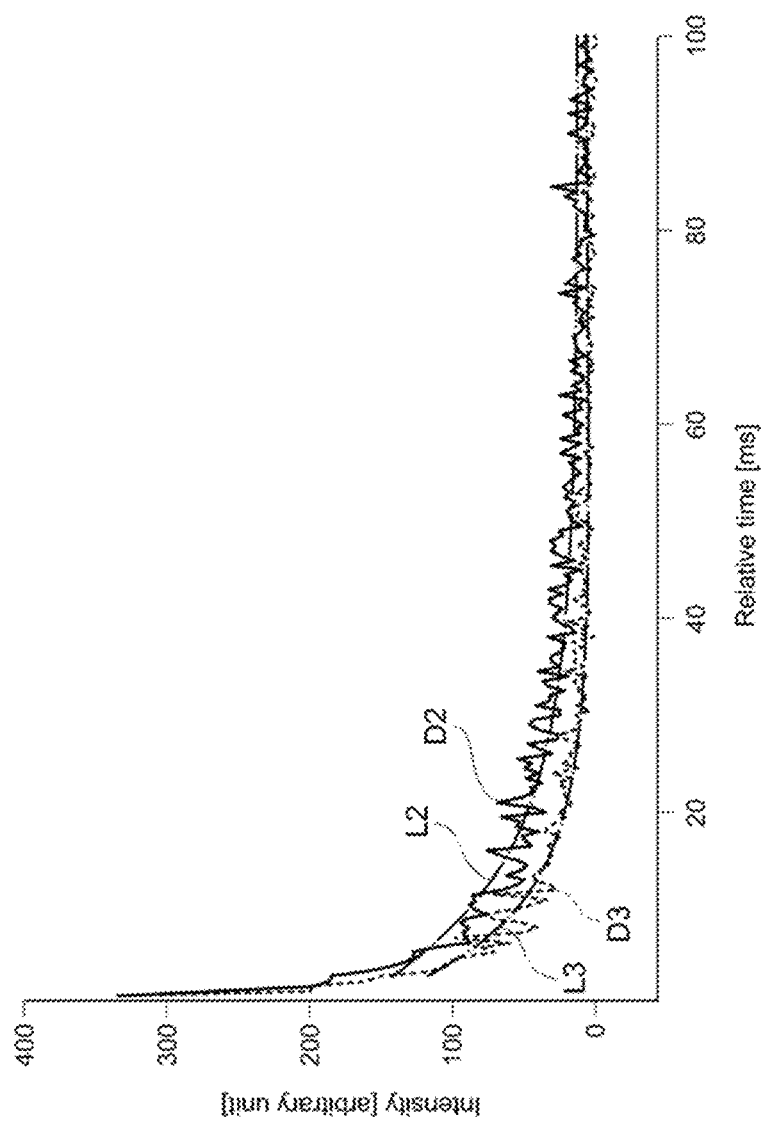

[Figure 11]
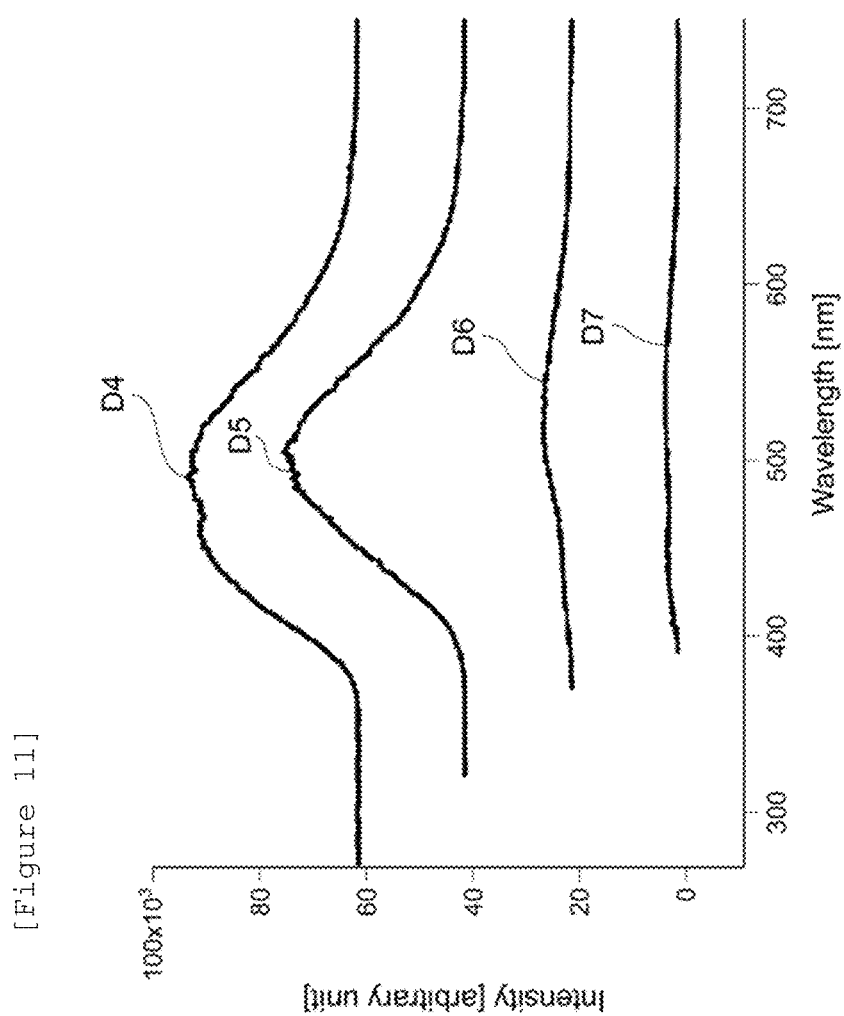

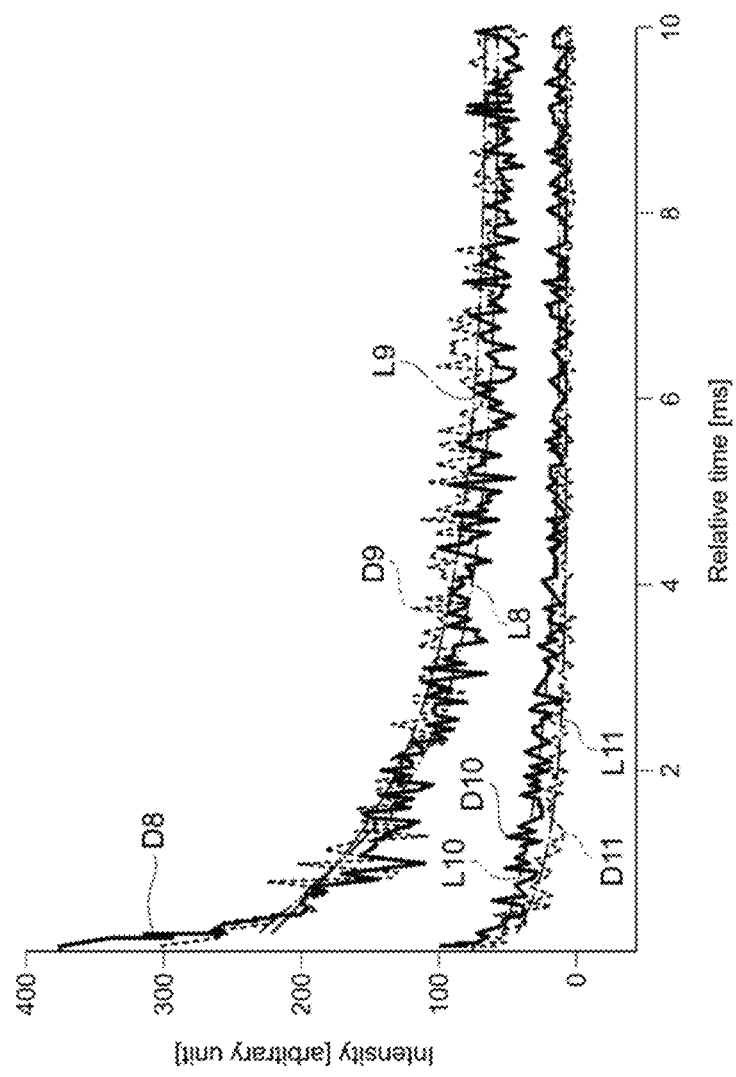
[Figure 12]

[Figure 13]
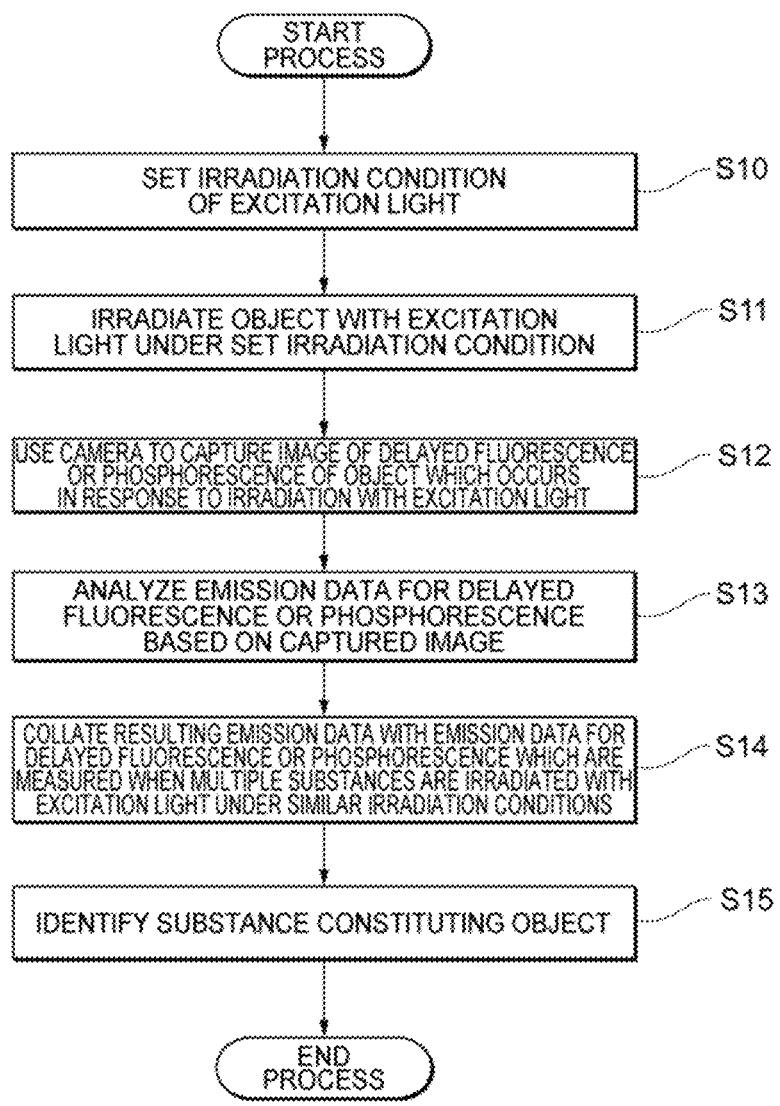

[Figure 14]
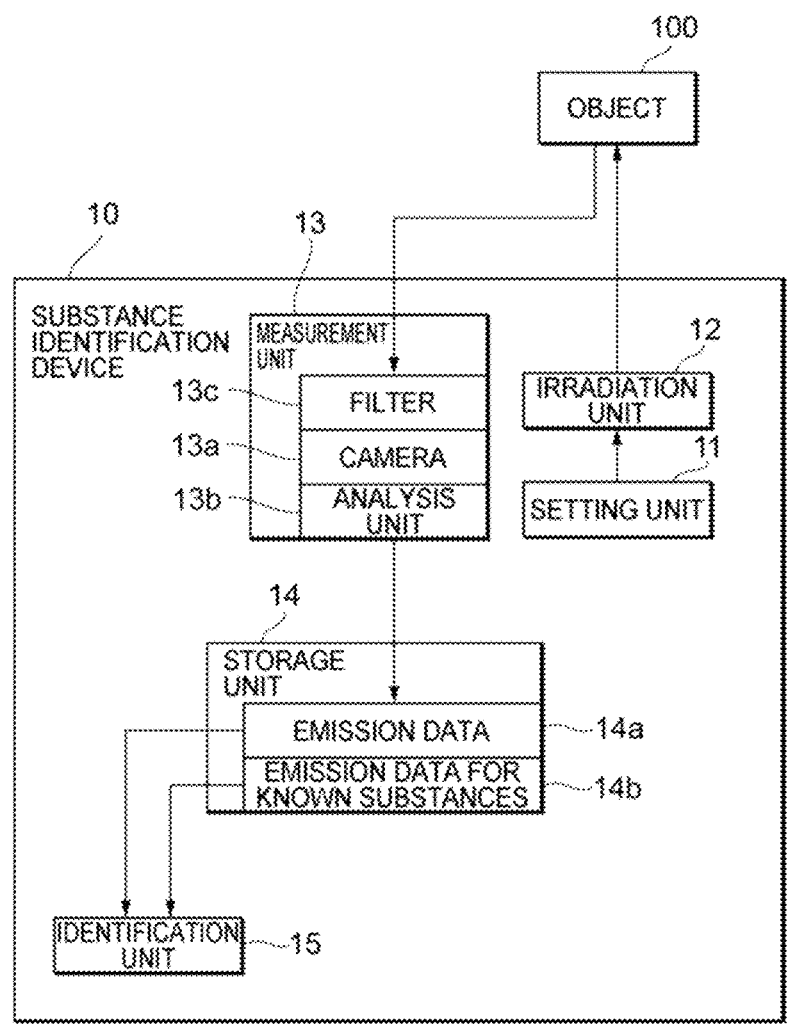

[Figure 15]
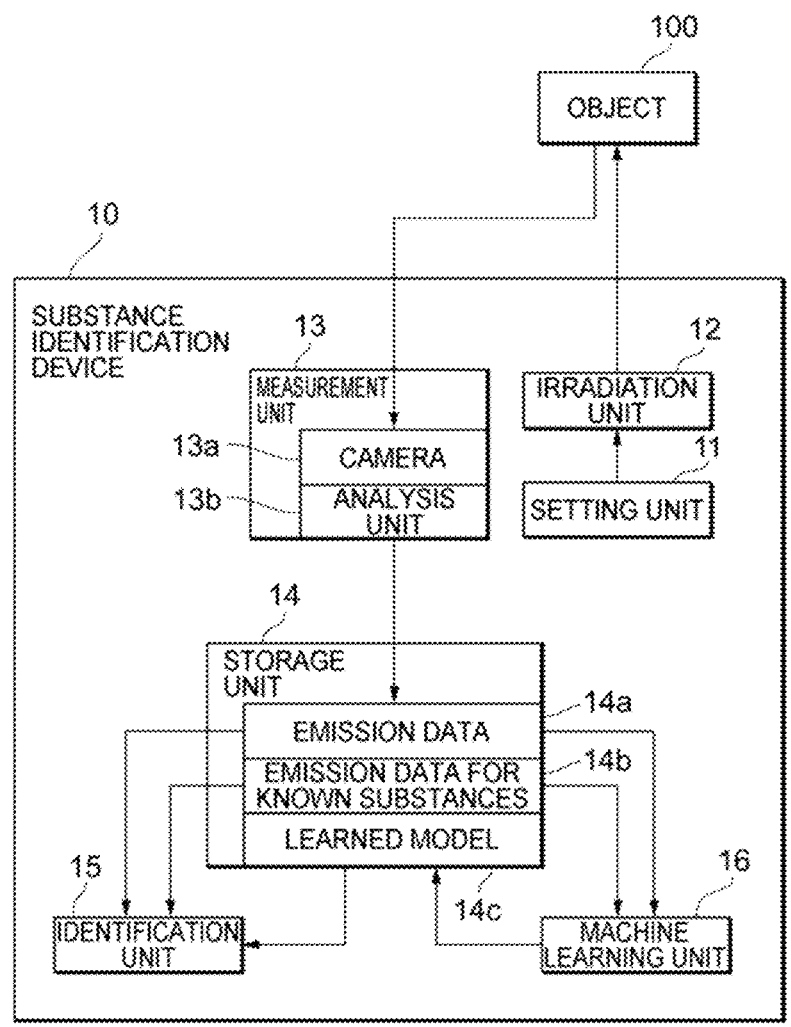

[Figure 16]
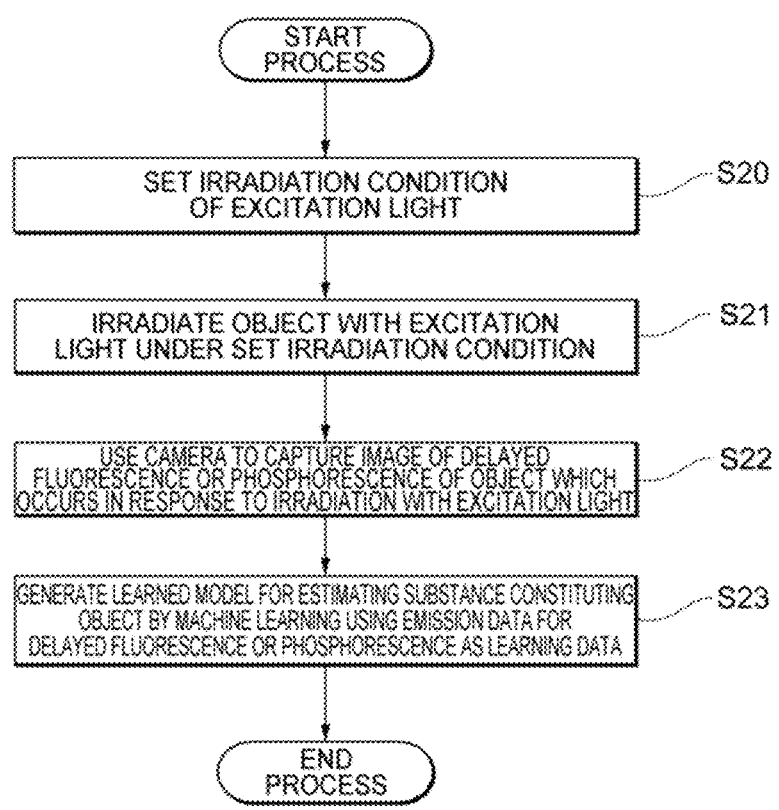

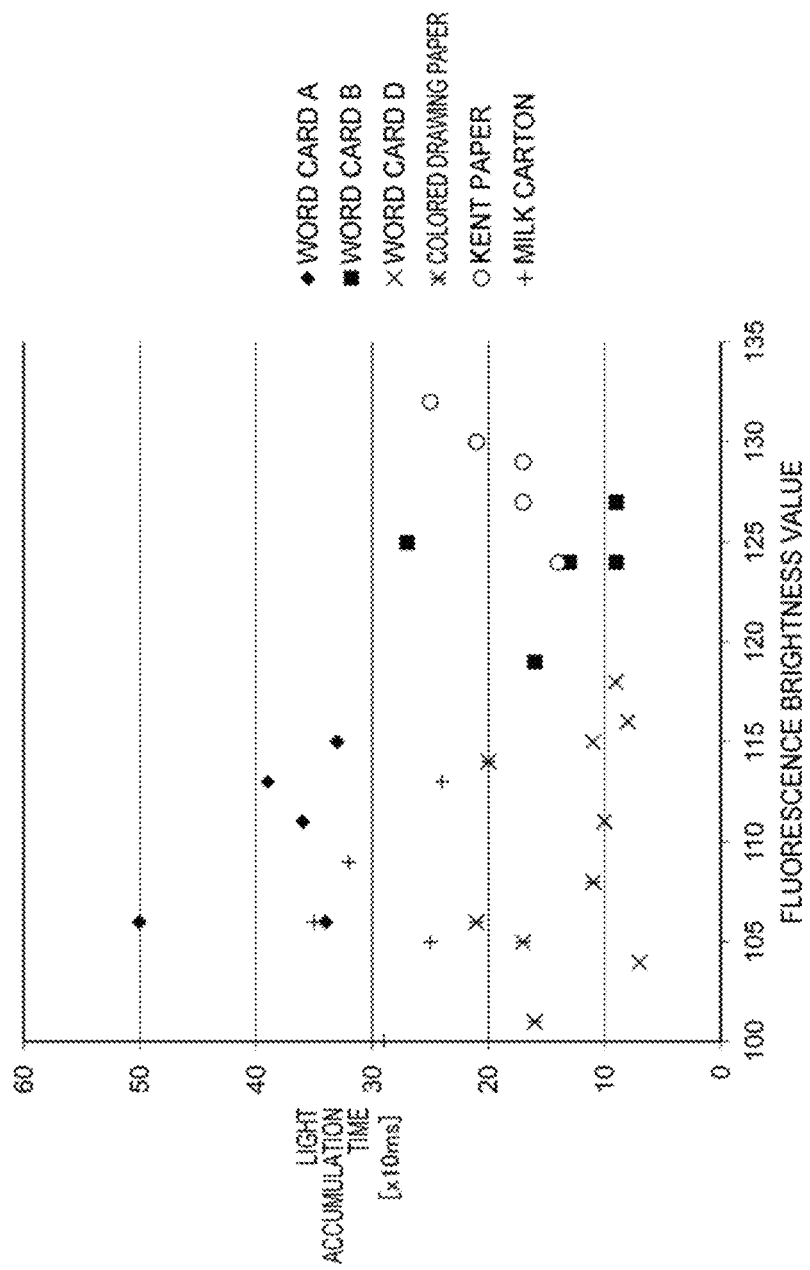
[Figure 17a]

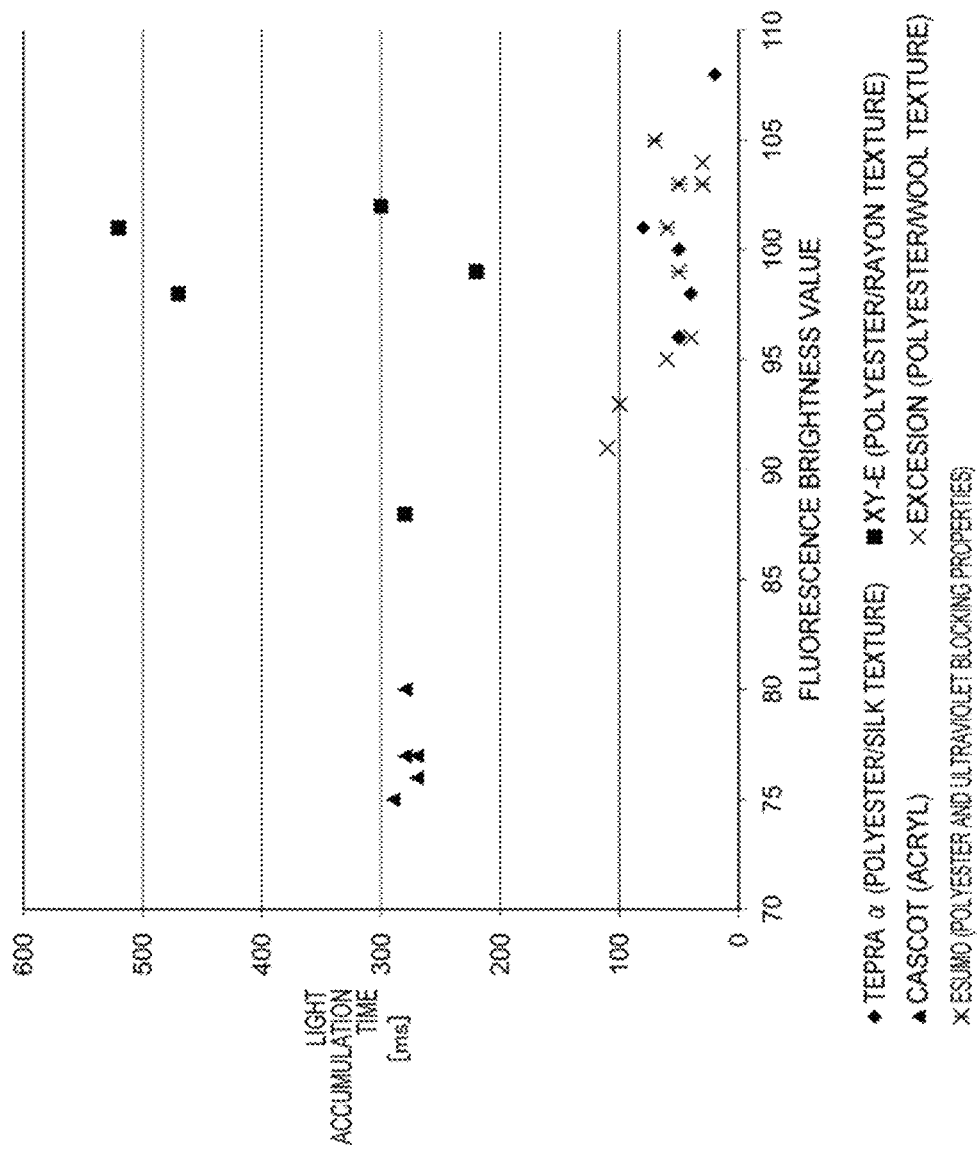
[Figure 17b]

[Figure 17c]
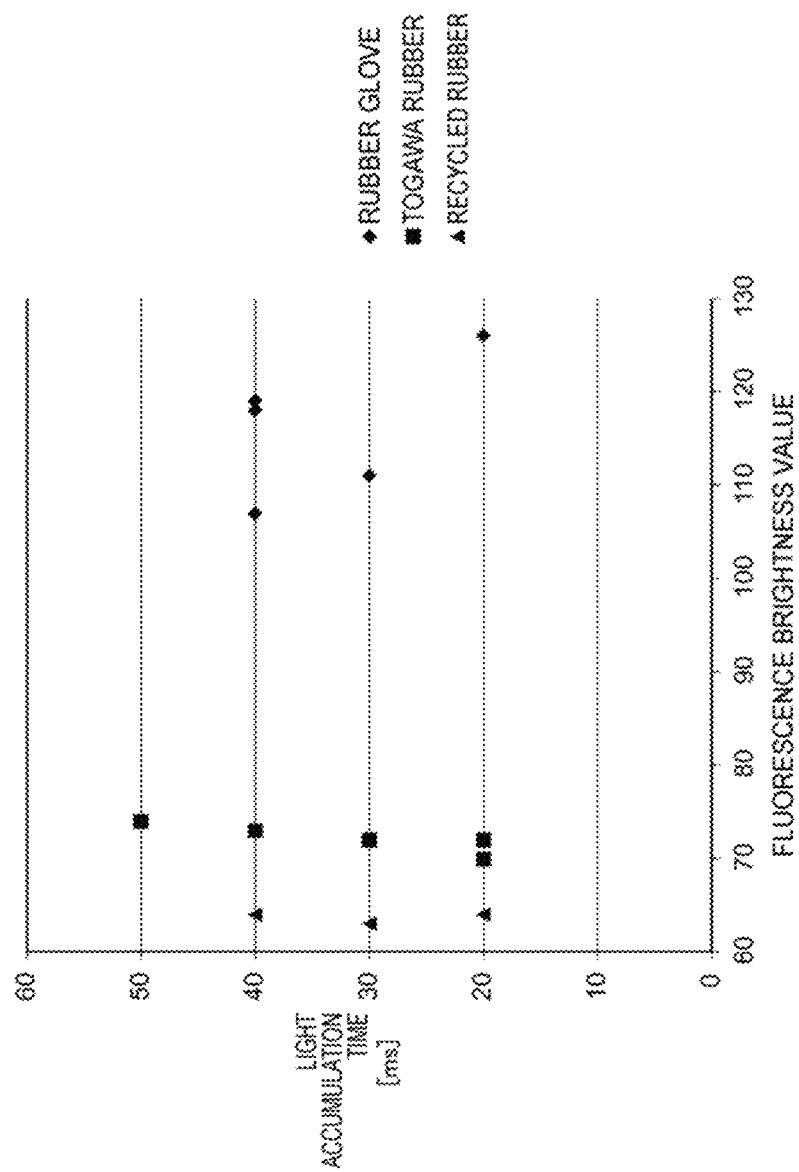

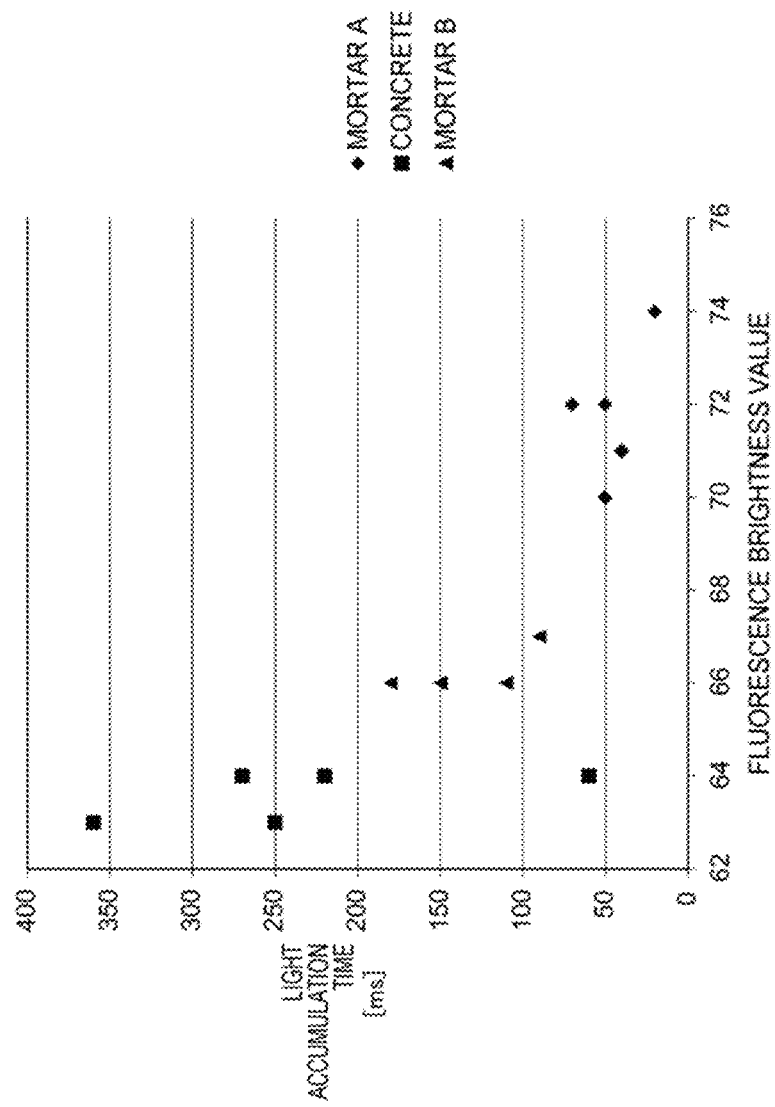
[Figure 17d]

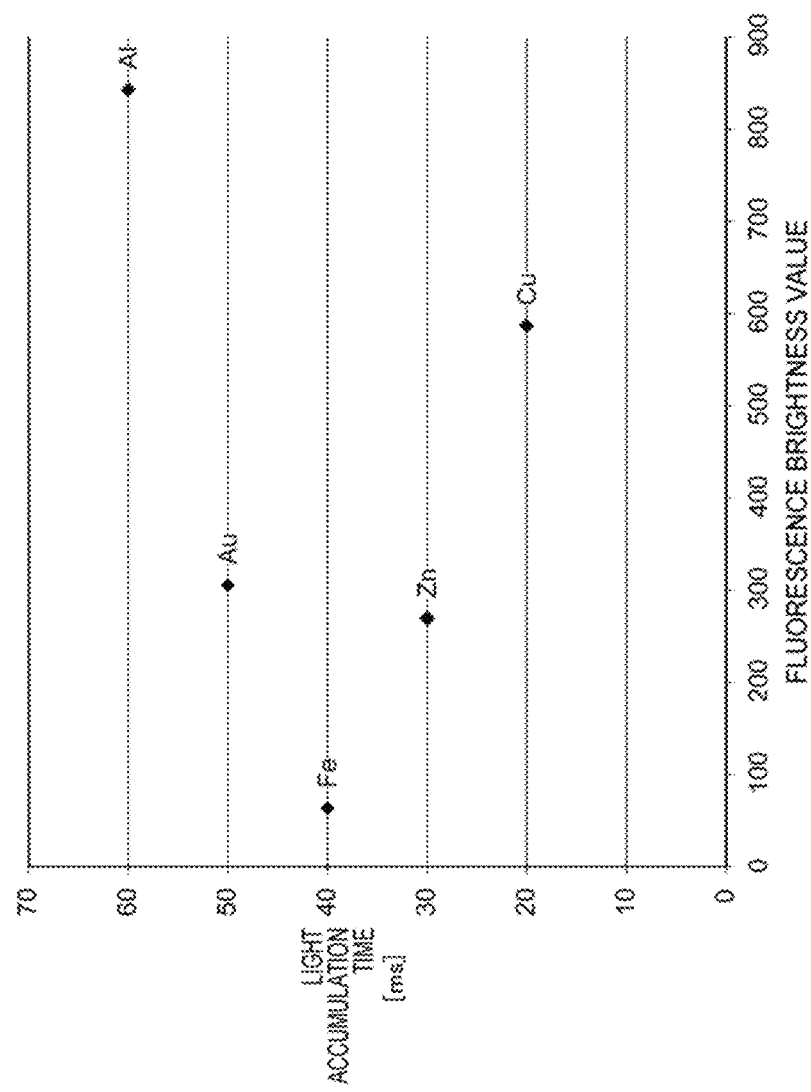
[Figure 17e]

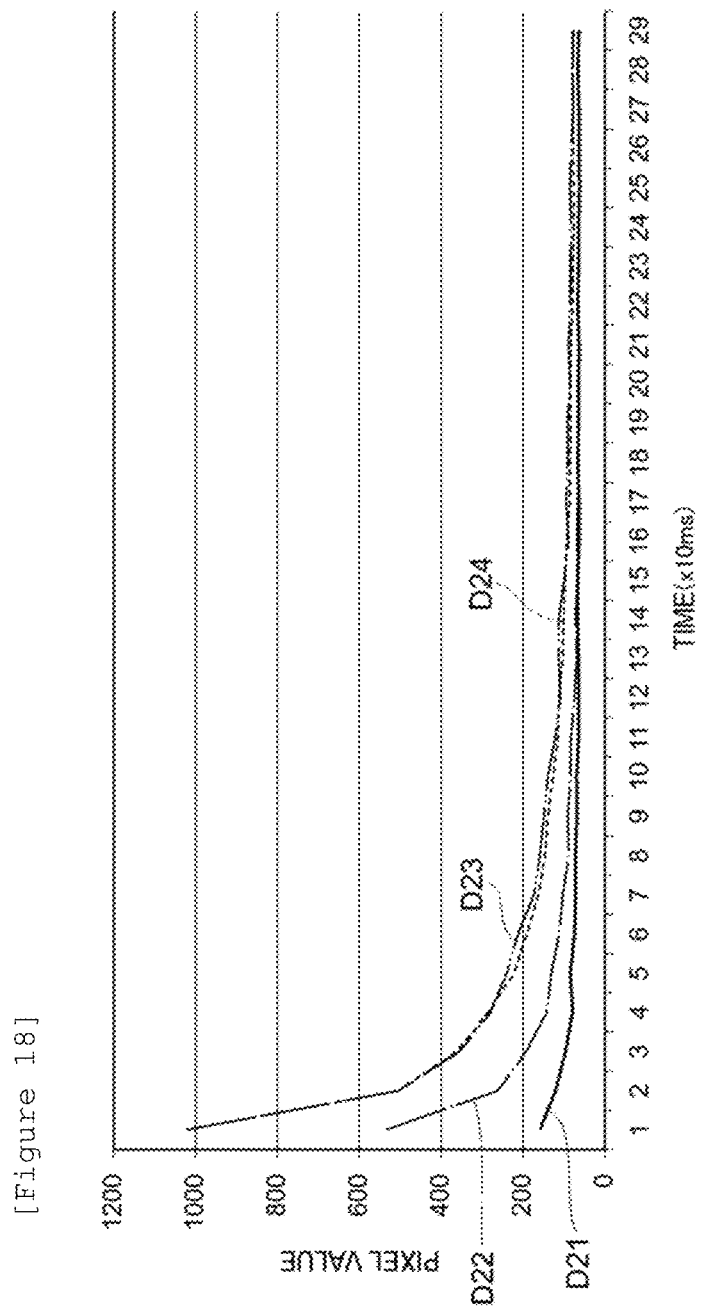
[Figure 18]

[Figure 19]
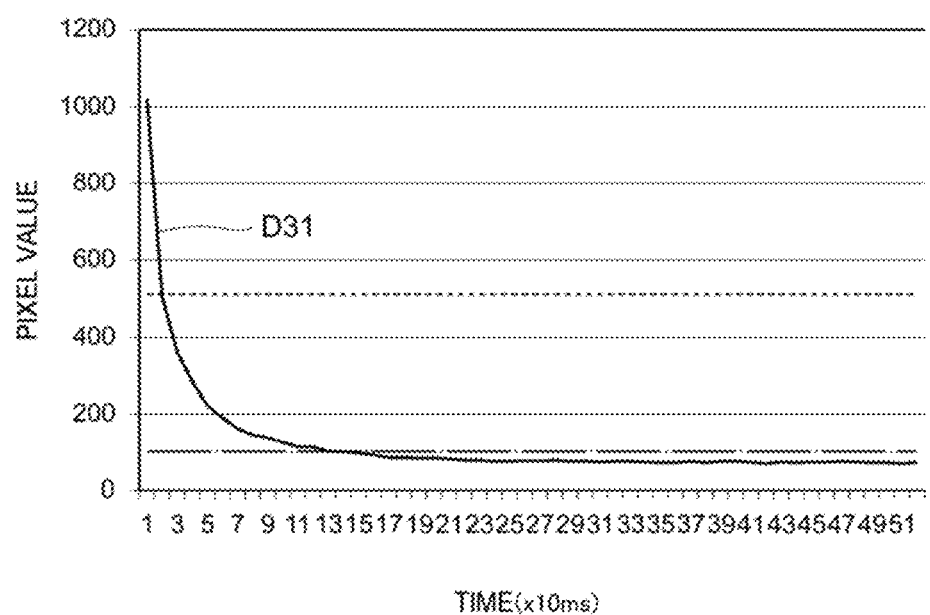

[Figure 20]
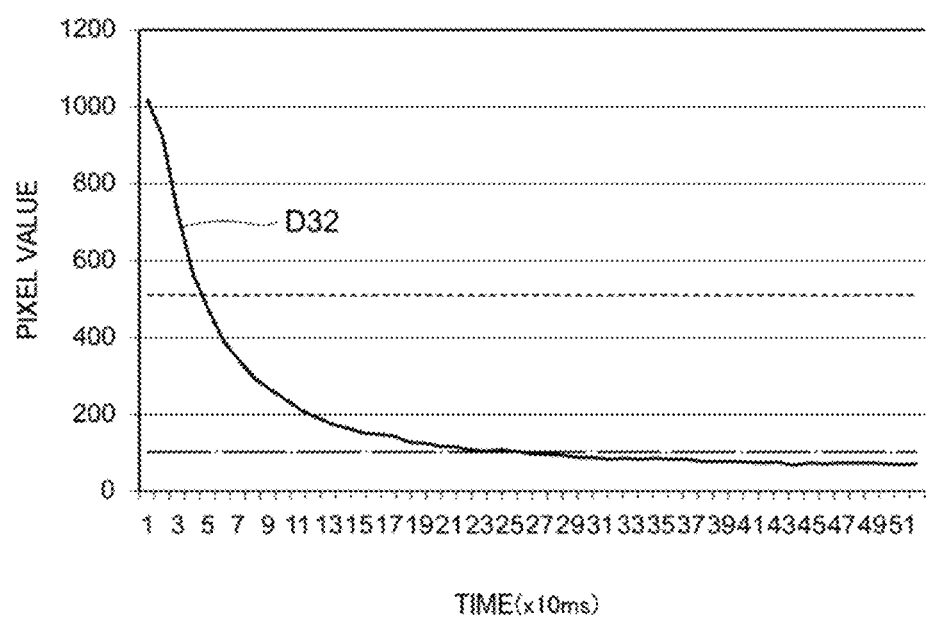

[Figure 22]

SUBSTANCE IDENTIFICATION DEVICE, SUBSTANCE IDENTIFICATION METHOD AND SUBSTANCE IDENTIFICATION PROGRAM

CROSS-REFERENCE TO RELATED APPLICATIONS

This application is a U.S. National Stage entry of PCT Application No: PCTJP2019036448 filed Sep. 18, 2019, which claims priority to Japanese Patent Application No. 2018-173837 filed Sep. 18, 2018, the contents of which are incorporated herein by reference.

TECHNICAL FIELD

The present invention relates to a substance identification device, a substance identification method and a substance identification program.

BACKGROUND ART

A conventional way to identify a substance constituting an object is by using light. For example, methods being used include absorption spectroscopy, which irradiates an object with light and measures an absorption spectrum to identify the substance constituting the object, and laser induced breakdown spectroscopy, which ionizes an object with laser and measures plasma light to identify the substance constituting the object. It is also possible to irradiate an object with excitation light for a relatively long time (several tens of seconds) and measure physical property values such as the spectrum of the resulting delayed fluorescence and fluorescence lifetime.

In relation to laser induced breakdown spectroscopy, Patent Literature 1 below, for example, describes a substance identification system, in which laser light is applied by a first laser unit, scattered light is measured, a range in which a substance exists is extracted from the result of measurement, and laser light is applied by a second laser unit different from the first laser unit and the spectrum of plasma light is measured.

In relation to measurement of fluorescence lifetime, Patent Literature 2 below, for example, describes a fluorescence lifetime measuring device, where a phosphor to be measured is placed on a stage and moved at a constant speed, the phosphor is irradiated with excitation light, elapsed time and persistence intensity are detected using an image that captures persistence of fluorescence which is generated due to the excitation light, and the fluorescence lifetime is computed.

In relation to utilization of delayed fluorescence, Patent Literature 3 below, for example, describes a device for determining the keeping quality of a plant. The device irradiates a plant with excitation light, takes an image of generated chlorophyll fluorescence and delayed fluorescence, and determines the keeping quality of the plant based on correlation between a ratio of quantity of the delayed fluorescence to quantity of the chlorophyll fluorescence and the keeping quality of the plant.

CITATION LIST

Patent Literature

Patent Literature 1: International Publication No. 2015/037643
Patent Literature 2: Japanese Patent Laid-Open No. 2010-164468
Patent Literature 3: Japanese Patent Laid-Open No. 2004-301638

SUMMARY OF INVENTION

Technical Problem

In identifying substances constituting an object by means of light, measurement can be performed with a fixed light irradiation condition in some cases. However, with the irradiation condition being fixed, emission data that are so similar that they are difficult to distinguish from each other could be measured for different substances, making identification of substances difficult.

Accordingly, the present invention provides a substance identification device, a substance identification method and a substance identification program that can identify substances with high accuracy by means of light.

Solution to Problem

A substance identification device according to an aspect of the present invention includes: a setting unit that sets an irradiation condition of excitation light; an irradiation unit that irradiates an object with the excitation light under the irradiation condition; a measurement unit that measures emission data for delayed fluorescence or phosphorescence of the object which occurs in response to the irradiation with the excitation light; and an identification unit that identifies a substance constituting the object based on the emission data and emission data for delayed fluorescence or phosphorescence which are measured when a plurality of substances are each irradiated with the excitation light under the irradiation condition.

According to this aspect, the object is irradiated with excitation light under a certain irradiation condition and a substance constituting the object is identified based on emission data for delayed fluorescence or phosphorescence which occurs in response to it and emission data for delayed fluorescence or phosphorescence which are measured for multiple kinds of substances under similar irradiation conditions. Accordingly, a substance can be identified with high accuracy while avoiding a situation where emission data that are so similar that they are difficult to distinguish from each other are measured for different substances.

In the above aspect, the irradiation unit may include one or more light sources for producing the excitation light of a plurality of different wavelengths.

According to this aspect, by irradiating the object with excitation light of multiple different wavelengths, it is possible to identify a substance with high accuracy by making use of emission data resulting from irradiation with excitation light of each wavelength.

In the above aspect, the irradiation condition may include at least any of a wavelength of the excitation light, an intensity of the excitation light and an irradiation time of the excitation light.

According to this aspect, by setting the irradiation condition including at least any of the wavelength of the excitation light, the intensity of the excitation light and the irradiation time of the excitation light, it is possible to apply excitation light under various conditions and measure emission data for delayed fluorescence or phosphorescence, so that emission data specific to substances can be measured and substances can be identified with high accuracy.

In the above aspect, the wavelength of the excitation light may be 10 nm or longer.

According to this aspect, by using excitation light with a wavelength of 10 nm or longer, management in the case of irradiating the object with excitation light can be simplified and operational costs for the substance identification device can be kept low.

In the above aspect, the emission data may include emission data for delayed fluorescence or phosphorescence that occurs after irradiation with the excitation light is stopped.

According to this aspect, by measuring emission data for delayed fluorescence or phosphorescence specific to substances, substances can be identified with high accuracy while avoiding a situation where emission data that are so similar that they are difficult to distinguish from each other are measured for different substances.

In the above aspect, the measurement unit may measure the emission data for the delayed fluorescence or the phosphorescence which has passed through a filter that blocks light of the wavelength of the excitation light.

According to this aspect, by preventing excitation light from directly entering the camera, emission data for delayed fluorescence or phosphorescence specific to a substance can be measured with high accuracy.

In the above aspect, the emission data may include at least either of an emission spectrum curve and a time decay curve of emission intensity.

According to this aspect, by measuring at least either of an emission spectrum curve and a time decay curve of emission intensity for delayed fluorescence or phosphorescence, emission data characterizing a substance can be measured and the substance can be identified with high accuracy.

In the above aspect, the identification unit may identify the substance constituting the object using at least any of a shape of the emission spectrum curve, a wavelength that gives a maximum emission intensity and a half width on the emission spectrum curve, an emission intensity ratio for different wavelengths on the emission spectrum curve, and an emission lifetime computed from the time decay curve.

According to this aspect, different substances can be distinguished by using quantities that characterize the emission spectrum and the emission lifetime and the substance can be identified with high accuracy.

In the above aspect, the measurement unit may consecutively capture images of the delayed fluorescence or the phosphorescence and measure the time decay curve based on a temporal change in a pixel value for the delayed fluorescence or the phosphorescence.

According to this aspect, a two-dimensional position of delayed fluorescence or phosphorescence can be determined and a time decay curve can be measured based on the temporal change of the position.

In the above aspect, the measurement unit may include a high-speed camera that captures images of the delayed fluorescence or the phosphorescence at a frame rate of 100 fps or higher.

According to this aspect, for a phenomenon where the emission intensity of delayed fluorescence or phosphorescence immediately after the irradiation with excitation light sharply decays such as shown in FIG. 7, fast and accurate acquisition of time resolution images and time resolution data (time-dependent data) for the emission intensity becomes possible only with application of the high-speed camera, such that emission data for delayed fluorescence or phosphorescence specific to a substance can be measured with high accuracy.

In the above aspect, the measurement unit may include a camera that captures images of the delayed fluorescence or the phosphorescence at a frame rate lower than 100 fps and the high-speed camera, such that the delayed fluorescence or the phosphorescence in a period with relatively rapid temporal change is captured with the high-speed camera and the delayed fluorescence or the phosphorescence in a period with relatively slow temporal change is captured with the camera.

According to this aspect, consecutive images can be captured at sufficient time resolution both in the periods with relatively rapid and relatively slow temporal change in delayed fluorescence or phosphorescence.

In the above aspect, the measurement unit may measure the emission data including data related to fluorescence of the object which occurs during irradiation with the excitation light.

According to this aspect, by measuring emission data including not only delayed fluorescence or phosphorescence but data related to fluorescence, a substance can be identified with high accuracy by avoiding a situation where emission data that are so similar that they are difficult to distinguish from each other are measured for different substances.

In the above aspect, the substance identification device may further include a machine learning unit that generates a learned model for estimating the substance constituting the object based on the emission data related to the object by machine learning using emission data for delayed fluorescence or phosphorescence related to known substances as learning data.

According to this aspect, using machine learning, substances can be identified with reduced burden for extracting feature values of the emission data.

A substance identification method according to a further aspect of the present invention includes: setting an irradiation condition of excitation light; irradiating an object with the excitation light under the set irradiation condition; measuring emission data for delayed fluorescence or phosphorescence of the object which occurs in response to the irradiation with the excitation light; and identifying a substance constituting the object based on the emission data and emission data for delayed fluorescence or phosphorescence which are measured when a plurality of substances are each irradiated with the excitation light under the irradiation condition.

According to this aspect, the object is irradiated with excitation light under a certain irradiation condition and a substance constituting the object is identified based on emission data for delayed fluorescence or phosphorescence which occurs in response to it and emission data for delayed fluorescence or phosphorescence which are measured for multiple kinds of substances under similar irradiation conditions. Accordingly, a substance can be identified with high accuracy while avoiding a situation where emission data that are so similar that they are difficult to distinguish from each other are measured for different substances.

A substance identification program according to a further aspect of the present invention causes a computer in a substance identification device to function as: a setting unit that sets an irradiation condition of excitation light; an irradiation unit that irradiates an object with the excitation light under the irradiation condition; a measurement unit that measures emission data for delayed fluorescence or phosphorescence of the object which occurs in response to the irradiation with the excitation light; and an identification unit that identifies a substance constituting the object based on the emission data and emission data for delayed fluorescence or phosphorescence which are measured when a plurality of substances ware each irradiated with the excitation light under the irradiation condition.

According to this aspect, the object is irradiated with excitation light under a certain irradiation condition and a substance constituting the object is identified based on emission data for delayed fluorescence or phosphorescence which occurs in response to it and emission data for delayed fluorescence or phosphorescence which are measured for multiple kinds of substances under similar irradiation conditions. Accordingly, a substance can be identified with high accuracy while avoiding a situation where emission data that are so similar that they are difficult to distinguish from each other are measured for different substances.

A substance identification device according to a further aspect of the present invention includes: a setting unit that sets an irradiation condition of excitation light; an irradiation unit that irradiates an object with the excitation light under the irradiation condition; a measurement unit that measures emission data related to light emission of the object which occurs with a delay relative to irradiation with the excitation light; and an identification unit that identifies a substance constituting the object based on the emission data and emission data related to light emission which occurs with a delay when a plurality of substances are each irradiated with the excitation light under the irradiation condition.

According to this aspect, the object is irradiated with excitation light under a certain irradiation condition and a substance constituting the object is identified based on emission data related to light emission which occurs with a delay in response to it and emission data related to light emission which occurs with a delay when multiple kinds of substances are irradiated with the excitation light under similar irradiation conditions. Accordingly, a substance can be identified with high accuracy while avoiding a situation where emission data that are so similar that they are difficult to distinguish from each other are measured for different substances.

Advantageous Effect of Invention

According to the present invention, a substance identification device, a substance identification method and a substance identification program that can identify substances with high accuracy by means of light are provided.

BRIEF DESCRIPTION OF DRAWINGS

FIG. 1 is a diagram showing functional blocks of a substance identification device according to an embodiment of the present invention.

FIG. 2 is a diagram showing a physical configuration of the substance identification device according to the embodiment.

FIG. 3 is a diagram showing emission data measured by the substance identification device according to the embodiment.

FIG. 4 is a diagram showing a first section of the emission data as measured by the substance identification device according to the embodiment.

FIG. 5 is a diagram showing a second section of the emission data as measured by the substance identification device according to the embodiment.

FIG. 6 is a diagram showing how an object is irradiated with excitation light by the substance identification device according to the embodiment.

FIG. 7 is a diagram showing an image of delayed fluorescence or phosphorescence of the object captured by the substance identification device according to the embodiment.

FIG. 8 is a diagram showing images of delayed fluorescence or phosphorescence of granulated sugar and corn starch captured by the substance identification device according to the embodiment.

FIG. 9 is a diagram showing first emission data measured by the substance identification device according to the embodiment.

FIG. 10 is a diagram showing a second emission data and a third emission data measured by the substance identification device according to the embodiment.

FIG. 11 is a diagram showing a fourth emission data, a fifth emission data, a sixth emission data and a seventh emission data measured by the substance identification device according to the embodiment.

FIG. 12 is a diagram showing an eighth emission data, a ninth emission data, a tenth emission data and an eleventh emission data measured by the substance identification device according to the embodiment.

FIG. 13 is a flowchart of a substance identification process which is executed by the substance identification device according to the embodiment.

FIG. 14 is a diagram showing functional blocks of the substance identification device according to a variant of the embodiment.

FIG. 15 is a diagram showing functional blocks of the substance identification device according to a second variant of the embodiment.

FIG. 16 is a flowchart of a learned model generation process which is executed by the substance identification device according to the second variant of the embodiment.

FIG. 17*a* shows a first example of a scatter diagram for emission data measured by the substance identification device according to the embodiment.

FIG. 17*b* shows a second example of a scatter diagram for emission data measured by the substance identification device according to the embodiment.

FIG. 17*c* shows a third example of a scatter diagram for emission data measured by the substance identification device according to the embodiment.

FIG. 17*d* shows a fourth example of a scatter diagram for emission data measured by the substance identification device according to the embodiment.

FIG. 17*e* shows a fifth example of a scatter diagram for emission data measured by the substance identification device according to the embodiment.

FIG. 18 is a diagram showing emission data measured with varying irradiation times of excitation light by the substance identification device according to the embodiment.

FIG. 19 is a diagram showing emission data which is measured when a sketchbook is irradiated with excitation light by the substance identification device according to the embodiment.

FIG. 20 shows emission data which is measured when a milk carton is irradiated with excitation light by the substance identification device according to the embodiment.

FIG. 22 is a diagram showing an image of delayed fluorescence or phosphorescence of a milk carton captured by the substance identification device according to the embodiment.

DESCRIPTION OF EMBODIMENTS

Figure 21:
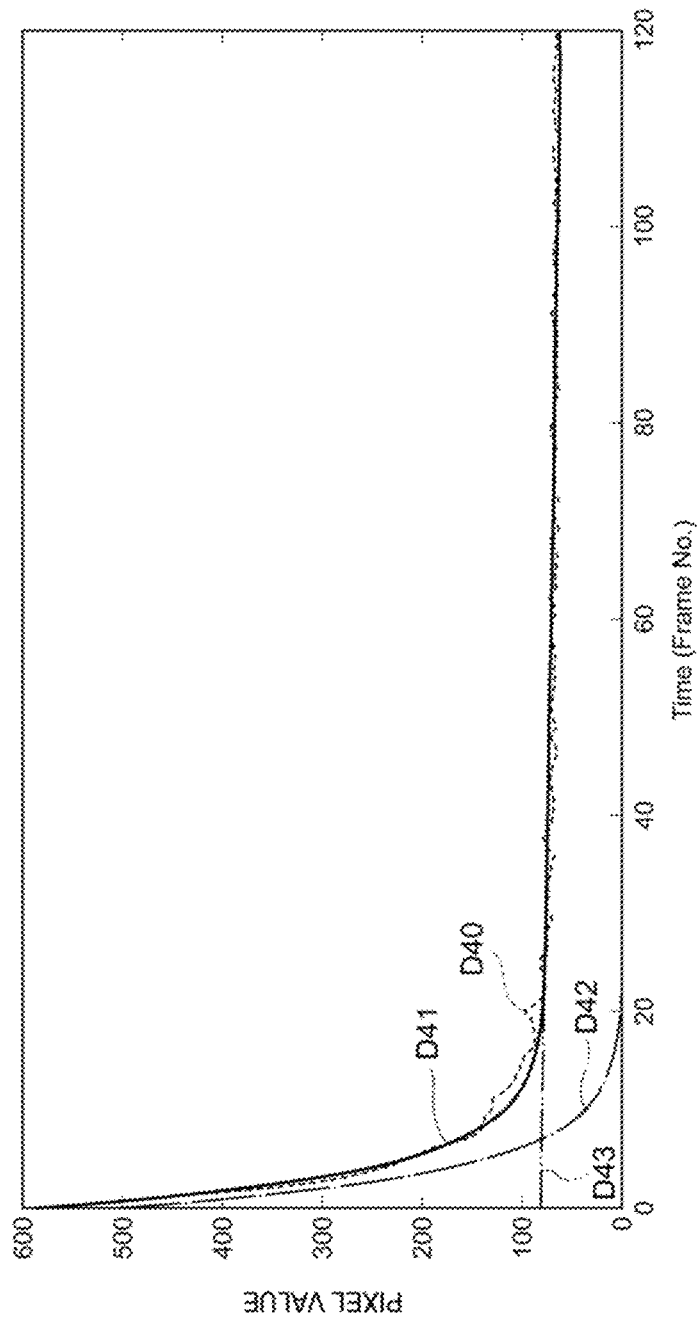
FIG. 21 is a diagram showing a time decay curve which is measured when a sketchbook is irradiated with excitation light by the substance identification device according to the embodiment and a decay curve approximating it.

An embodiment according to an aspect of the present invention (referred to as the "present embodiment") is described based on the drawings. In the figures, elements with the same reference numeral have the same or similar configurations.

FIG. 1 is a diagram showing functional blocks of a substance identification device 10 according to the present embodiment of the present invention. The substance identification device 10 includes a setting unit 11, an irradiation unit 12, a measurement unit 13, a storage unit 14 and an identification unit 15. The substance identification device 10 irradiates the object 100 with excitation light under a certain irradiation condition, and identifies a substance constituting the object 100 based on emission data for delayed fluorescence or phosphorescence which occurs in response to it and emission data for delayed fluorescence or phosphorescence which are previously measured for multiple kinds of substances under similar irradiation conditions.

The object 100 can be a matter formed from any substance; it may be any of gas, liquid and solid, or an inorganic matter or an organic matter. For example, the object 100 may include paper, cardboard, fabric, hair, synthetic fiber, food, concrete, semiconductors such as Si, GaAs, GaP and InP, etc. The object 100 may also be an organism such as a plant and human body. The object 100 may also be a metal or a metal oxide. The object 100 can be white sugar, for example, which is assumed to be difficult to distinguish from white salt by the naked eye. In this case, by having emission data for white sugar and white salt as previously measured emission data, the substance identification device 10 can determine that the object 100 is constituted of white sugar remotely in a non-contact manner.

The setting unit 11 sets the irradiation condition of excitation light. The irradiation condition of excitation light includes at least any of a wavelength of the excitation light, an intensity of the excitation light and an irradiation time of the excitation light. For example, the wavelength of the excitation light may be 200 nm to 400 nm, i.e., the ultraviolet range, though it may also be 200 nm or less, i.e., the far ultraviolet range, or 400 nm or more, i.e., the visible light range. Also, when emission lifetime is used for substance identification, the wavelength of the excitation light may be set to a relatively short wavelength because the emission lifetime of delayed fluorescence or phosphorescence tends to be longer as the wavelength of the excitation light is shorter (i.e., greater energy intensity). Similarly, when emission lifetime is used for substance identification, the intensity of the excitation light may be set to relatively strong intensity because the emission lifetime of delayed fluorescence or phosphorescence tends to be longer as the intensity of the excitation light is stronger. Similarly, when emission lifetime is used for substance identification, the irradiation time of the excitation light may be set to a relatively long time because the emission lifetime of delayed fluorescence or phosphorescence tends to be longer as the irradiation time of the excitation light is longer. However, the emission lifetime of delayed fluorescence or phosphorescence can cease changing even if the irradiation time of the excitation light is extended beyond a certain amount of time, so that the irradiation time of excitation light may be set to a shortest time in a range of time with which the emission lifetime of delayed fluorescence or phosphorescence approaches a maximum. Such an example will be described later with FIG. 18. By setting the irradiation condition including at least any of the wavelength of the excitation light, the intensity of the excitation light and the irradiation time of the excitation light, it is possible to apply excitation light under various conditions and measure emission data for delayed fluorescence or phosphorescence, so that emission data specific to substances can be measured and substances can be identified with high accuracy.

The irradiation unit 12 irradiates the object 100 with excitation light under the irradiation condition set by the setting unit 11. The irradiation unit 12 may be formed from ultraviolet laser or ultraviolet LED (Light Emitting Diode), for example. The wavelength of the excitation light applied by the irradiation unit 12 may be 10 nm or longer. Use of excitation light with a wavelength of 10 nm or longer can simplify management in the case of irradiating the object 100 with excitation light and keep operational costs for the substance identification device 10 low. The irradiation unit 12 may include one or more light sources for producing excitation light of multiple different wavelengths. The irradiation unit 12 may include a wavelength-variable laser or LED as the light source or include multiple lasers or LEDs with different wavelengths as the light source. By irradiating the object 100 with excitation light of multiple different wavelengths via the irradiation unit 12, it is possible to identify a substance with high accuracy by making use of emission data resulting from irradiation with excitation light of each wavelength, as discussed later.

The measurement unit 13 measures emission data related to light emission of the object 100 which occurs with a delay relative to irradiation with excitation light. More specifically, the measurement unit 13 measures emission data for the delayed fluorescence or phosphorescence of the object 100 which occurs in response to irradiation with excitation light. The light emission of the object 100 which occurs with a delay relative to irradiation with excitation light may include other delayed fluorescence, persistence or light accumulation, aside from delayed fluorescence or phosphorescence. The measurement unit 13 includes a camera 13a and an analysis unit 13b. The camera 13a captures a light emission image of the delayed fluorescence or phosphorescence of the object 100 which occurs in response to irradiation with excitation light. The camera 13a may be a high-speed camera which captures images of delayed fluorescence or phosphorescence at a frame rate of 100 fps or higher. The frame rate of the high-speed camera may also be 1,000 fps or 10,000 fps or higher. With a high-speed camera, for a phenomenon where the emission intensity of delayed fluorescence or phosphorescence immediately after the irradiation with excitation light sharply decays such as shown in FIG. 7, fast and accurate acquisition of time resolution images and time-dependent data on the emission intensity becomes possible only with application of a high-speed camera, such that emission data for delayed fluorescence or phosphorescence specific to a substance can be measured with high accuracy. When the delayed fluorescence or phosphorescence of the object 100 is captured with a high-speed camera, images with light multiplied by an image intensifier may be captured. It is also possible to handle neighboring pixels as one pixel via a binning function and capture images of delayed fluorescence or phosphorescence with enhanced sensitivity. It is also possible to apply reduction processing or expansion processing to a captured image to generate an image with an improved S/N ratio. When the delayed fluorescence or phosphorescence of the object 100 is captured with a high-speed camera, the intensity of excitation light may be increased according to frame rate. Use of the camera 13a also enables measurement of the delayed fluorescence or phosphorescence of the object 100 on two- or three-dimensional coordinates. This in turns enables identifying coordinate positions with high resolution based on pixel arrangement and identifying the substance constituting the object 100 based on the respective coordinate positions. Thus, fast measurement becomes possible compared to the conventional fluorescence lifetime measurement. As indicated, the device of the present invention has an advantage of being able to measure time-dependent data for delayed fluorescence or phosphorescence intensity with time resolution (e.g., 0.01 milliseconds to 10 milliseconds) by irradiating the object with excitation light for a short time (e.g., 0.01 milliseconds to 500 milliseconds). Further, because the device of the present invention captures delayed fluorescence or phosphorescence via exposure of a short time, it has a feature of being usable also in a situation where the object 100 would move between imaging frames or a situation where motion blur would occur in the case of long-time exposure.

The analysis unit 13b analyzes emission data for the delayed fluorescence or phosphorescence of the object based on an image captured by the camera 13a. Here, the emission data may include emission data for delayed fluorescence or phosphorescence that occurs after irradiation with excitation light is stopped. However, the emission data may also include emission data for delayed fluorescence or phosphorescence that occurs during irradiation with excitation light. By measuring emission data for delayed fluorescence or phosphorescence that occurs after irradiation with excitation light is stopped, a substance can be identified with high accuracy by avoiding a situation where emission data that are so similar that they are difficult to distinguish from each other are measured for different substances.

The emission data may also include at least either of an emission spectrum curve and a time decay curve of emission intensity. The time decay curve of emission intensity will be described in detail with FIGS. 3 to 6. By measuring at least either of an emission spectrum curve and a time decay curve of emission intensity for delayed fluorescence or phosphorescence, emission data characterizing a substance can be measured and the substance can be identified with high accuracy.

The measurement unit 13 may also measure emission data including data related to fluorescence of the object 100 which occurs during irradiation with excitation light. That is, the measurement unit 13 may measure not only emission data for the delayed fluorescence or phosphorescence of the object 100 but data related to normal fluorescence. In that case, the emission data will include data related to fluorescence and data related to delayed fluorescence or phosphorescence. By thus measuring emission data including not only delayed fluorescence or phosphorescence but data related to fluorescence, a substance can be identified with high accuracy by avoiding a situation where emission data that are so similar that they are difficult to distinguish from each other are measured for different substances.

The storage unit 14 stores emission data 14a for delayed fluorescence or phosphorescence which is measured when the object 100 is irradiated with excitation light under a certain irradiation condition and emission data 14b for delayed fluorescence or phosphorescence which is measured when a known substance is irradiated with excitation light under one or more irradiation conditions. Here, the emission data 14b for a known substance may include emission data for delayed fluorescence or phosphorescence which are measured for irradiation with excitation light under multiple irradiation conditions with varying wavelengths of excitation light, intensifies of excitation light and irradiation times of excitation light.

The identification unit 15 identifies the substance constituting the object 100 based on the emission data 14a which is measured when the object 100 is irradiated with excitation light under a certain irradiation condition and the emission data 14b for delayed fluorescence or phosphorescence which are measured when multiple substances are each irradiated with excitation light under similar irradiation conditions. More specifically, the substance constituting the object 100 is identified by collating the emission data 14a which is measured when the object 100 is irradiated with excitation light under a certain irradiation condition against the emission data 14b for delayed fluorescence or phosphorescence which are measured when multiple substances are each irradiated with excitation light under similar irradiation conditions. The identification unit 15 identifies the irradiation condition set by the setting unit 11 and identifies the emission data 14b for a known substance which is measured under an irradiation condition that is identical or closest to that irradiation condition. Then, the identification unit 15 collates the emission data 14a for the object 100 against the identified emission data 14b for the known substance, and identifies the substance constituting the object 100 based on similarity between those emission data. For example, in a case where a substance is identified using an emission spectrum of delayed fluorescence or phosphorescence, robust collation can be performed using normalized emission data by computing a ratio between a width of a peak of a spectrum measured for the object 100 (e.g., half width) and a width of a tail (e.g., a width which is outside the half width of the peak and over which 0.1% of the peak intensity is reached), and comparing the ratio with a ratio between the width of the peak of the spectrum of a known substance and the width of its tail. The identification unit 15 may also identify the substance constituting the object 100 by computing a difference in peak wavelengths or a peak intensity ratio of emission spectra resulting from irradiation with excitation light of different wavelengths, and comparing it with the difference in peak wavelengths or peak intensity ratio of emission spectra of a known substance. In the case of identifying a substance using the emission lifetime of delayed fluorescence or phosphorescence, robust collation can be performed by identifying the intensity of excitation light at which the emission lifetime becomes saturated for the object 100 and comparing the intensity with the intensity of excitation light at which the emission lifetime becomes saturated for a known substance.

The identification unit 15 may input the emission data 14a which is measured when the object 100 is irradiated with excitation light under a certain irradiation condition to a learned model such as a neural network, and identify the emission data 14b of a known substance to which the emission data 14a has similarity via the learned model. In this case, the learned model may be generated via supervised learning using various emission data as learning data or be generated via unsupervised learning such as clustering. Here, the learned model, the learning data, the emission data 14a and the emission data 14b for known substances only have to be accessible over a communication network and are not necessarily stored in the storage unit of the substance identification device 10.

In this manner, the substance identification device 10 according to the present embodiment can irradiate the object with excitation light under a certain irradiation condition and identify a substance with high accuracy based on emission data for the delayed fluorescence or phosphorescence which occurs in response to it as well as emission data for delayed fluorescence or phosphorescence which are measured under a similar irradiation condition for multiple substances, while avoiding a situation where emission data that are so similar that they are difficult to distinguish from each other are measured for different substances.

For example, assume that a first substance and a second substance are randomly distributed in the object 100 and the first substance and the second substance have similar emission spectra in terms of fluorescence. Assume also that the first substance and the second substance have the same appearance under visible light. If identification of the substances constituting the object 100 is performed under such a condition by fluorescence measurement and visual examination under visible light, the first substance and the second substance would probably not be determined. By contrast, given that the first substance and the second substance have different characteristics in terms of light accumulation phenomenon and are different in the emission spectrum and/or emission lifetime of delayed fluorescence or phosphorescence, determination of the first substance and the second substance is possible using that information. Particularly by using emission spectra and emission lifetime data acquired by irradiation with excitation light of multiple wavelengths as mentioned above, constituent substances can be identified even for a complicated system such as a mixed substance. Thus, with the substance identification device 10 according to the present embodiment, when the first substance and the second substance are spatially randomly distributed in the object 100, for example, the distribution of these substances or their proportions of mixture can be identified by measuring delayed fluorescence or phosphorescence generated by the object 100. When light emission of the first substance and light emission of the second substance are included in one pixel, the proportions of mixture of the light emission of the first substance and the second substance at that pixel's position may be identified by means of a weighted sum of the emission spectrum and/or emission lifetime related to the first substance and the emission spectrum and/or emission lifetime related to the second substance.

The substance identification device 10 according to the present embodiment can also remotely determine how much a particular substance is contained in the object 100 by irradiating the object 100 with excitation light. Accordingly, the substance identification device 10 can be applied to determining the quality or error rate of paper manufactured at a paper mill, for example. For an object 100 in which substances with similar appearances under visible light (e.g., salt and sugar) are mixed, their mixture ratio can be remotely identified by irradiating the object 100 with excitation light and measuring emission data for delayed fluorescence or phosphorescence via the substance identification device 10, which enables checking whether the mixture ratio is a desired value.

FIG. 2 is a diagram showing a physical configuration of the substance identification device 10 according to the present embodiment. The substance identification device 10 includes a CPU (Central Processing Unit) 10a serving as an arithmetic unit, a RAM (Random Access Memory) 10b serving as the storage unit, a ROM (Read Only Memory) 10c serving as the storage unit, a communication unit 10d, an input unit 10e and a display unit 10f. These components are connected so as to be able to transmit and send data to/from each other over a bus. Although in this example the substance identification device 10 is described as being composed of a single computer, the substance identification device 10 may also be embodied in a combination of multiple computers. The components shown in FIG. 2 is an example; the substance identification device 10 may include components other than the components or may not include some of them.

The CPU 10a is a controller that performs control related to execution of a program stored in the RAM 10b or the ROM 10c, and data computation and manipulation. The CPU 10a is an arithmetic unit that executes a program for identifying a substance based on emission data (a substance identification program). The CPU 10a receives various data from the input unit 10e and the communication unit 10d, displays a data computation result on the display unit 10f and/or stores it in the RAM 10b or the ROM 10c.

The RAM 10b is a part of the storage unit that allows rewriting of data and may be composed of a semiconductor storage device, for example. The RAM 10b may store the substance identification program to be executed by the CPU 10a and emission data for delayed fluorescence and phosphorescence related to multiple substances, etc. They are illustrative examples; data other than them may be stored in the RAM 10b or some of them may not be stored.

The ROM 10c is a part of the storage unit that allows reading of data and may be composed of a semiconductor storage device, for example. The ROM 10c may store the substance identification program or data that is not rewritten, for example.

The communication unit 10d is an interface that connects the substance identification device 10 to other devices. The communication unit 10d may be connected to a communication network such as the internet.

The input unit 10e receives an input of data from a user and may include a keyboard and a touch panel, for example.

The display unit 10f visually displays a computation result from the CPU 10a and may be composed of an LCD (Liquid Crystal Display), for example. The display unit 10f may display a result of substance identification and measured emission data.

The substance identification program may be provided by being stored on a computer-readable storage medium such as the RAM 10b and the ROM 10c or provided over a communication network connected via the communication unit 10d. In the substance identification device 10, the various operations described with FIG. 1 are implemented by execution of the substance identification program by the CPU 10a. These physical components are illustrative examples; they may not necessarily be independent components. For example, the substance identification device 10 may include an LSI (Large-Scale Integration) on which the CPU 10a, the RAM 10b and the ROM 10c are integrated.

FIG. 3 is a diagram showing emission data L measured by the substance identification device 10 according to the present embodiment. The emission data L is acquired by irradiating plain paper as the object 100 with laser of a particular wavelength as excitation light for 500 ms, capturing images during and around the irradiation at 250 fps with the camera 13a (a high-speed camera), and representing the pixel value of a pixel at a center coordinate being irradiated with excitation light as 8 bits (0 to 255) among pixels in the result of image capturing. A horizontal axis in the figure represents the number of image frames, where a numerical value on the horizontal axis can be converted to ms unit by quadrupling it. A vertical axis in the figure represents the pixel value at the position of irradiation with laser serving as excitation light.

From the emission data L, it can be seen that the pixel value reaches a maximum (255) immediately after the start of irradiation with excitation light and remains at the maximum during the irradiation, then delayed fluorescence or phosphorescence is emitted after the end of irradiation with excitation light, and then the pixel value gradually decreases from the maximum to a minimum. In the following, a first section A representing change in the pixel value around the start of irradiation with excitation light and a second section B representing change in the pixel value around the end of irradiation with excitation light will be each described in detail.

FIG. 4 is a diagram showing the first section A of the emission data L as measured by the substance identification device 10 according to the present embodiment. Again, the horizontal axis represents the number of image frames and the vertical axis represents the pixel value at the position of laser irradiation.

According to the first section A of the emission data L, the pixel value reaches the maximum at about one frame (4 ms) after the start of irradiation with excitation light and then becomes constant.

FIG. 5 is a diagram showing the second section B of the emission data L as measured by the substance identification device 10 according to the present embodiment. Again, the horizontal axis represents the number of image frames and the vertical axis represents the pixel value at the position of laser irradiation.

The second section B of the emission data L includes an exponential decay section B1 and a moderate decay section B2. Upon the end of irradiation with excitation light, the exponential decay section B1 immediately starts and the pixel value decreases exponentially. In the case of this example, the exponential decay section B1 lasts for about five frames (20 ms) after the end of irradiation with excitation light, and during it the pixel value decreases by about 70% from the maximum.

Following the exponential decay section B1, the moderate decay section B2 lasts for about 24 frames (96 ms), during which the pixel value decreases to the minimum.

Although in this example the single camera 13a captures images after irradiation with excitation light at 250 fps, the measurement unit 13 may also include a camera that captures images of the delayed fluorescence or phosphorescence of the object 100 at a frame rate lower than 100 fps and the high-speed camera, such that delayed fluorescence or phosphorescence in a period with relatively rapid temporal change is captured with the high-speed camera and delayed fluorescence or phosphorescence in a period with relatively slow temporal change is captured with the camera. Here, the period with relatively rapid temporal change is the exponential decay section B1, for example, and the period with relatively slow temporal change is the decay section B2, for example. In this case, the high-speed camera may be one that is capable of capturing change in luminosity on the order of 10 nsec, that is, capturing images at about $10^8$ fps. Such use of two cameras, i.e., a high-speed camera and a relatively slow camera, enables consecutive images to be captured at sufficient time resolution both in the periods with relatively rapid and relatively slow temporal change in delayed fluorescence or phosphorescence.

In this example, the irradiation time of excitation light is 500 ms, but this value can be set as desired. In a case where the object 100 is plain paper (a sketchbook in this example), the lifetime of delayed fluorescence or phosphorescence tends to be saturated with the irradiation time of excitation light being about 700 ms or longer. Thus, the irradiation time of excitation light on the object 100 may be set at or above an irradiation time with which the lifetime of delayed fluorescence or phosphorescence is saturated. The irradiation time of excitation light with which the lifetime of delayed fluorescence or phosphorescence is saturated depends on the substance constituting the object 100.

FIG. 6 is a diagram showing an image which is captured during irradiation of the object 100 with excitation light by the substance identification device 10 according to the present embodiment. In the figure, a light emitting portion Lp emitting light due to irradiation with excitation light, reflected light R, and jigs J used for measurement are captured. The measurement unit 13 may consecutively capture images of the delayed fluorescence or phosphorescence of the object 100 and measure a time decay curve based on a temporal change in the pixel value for the delayed fluorescence or phosphorescence. The greatest pixel value in the emission data L shown in FIGS. 3 to 5 is the pixel value of the pixel at the central coordinate of the light emitting portion Lp being irradiated with excitation light in FIG. 6. The measurement unit 13 may measure the time decay curve of the delayed fluorescence or phosphorescence of the object 100 by identifying a circular region on the image being irradiated with excitation light and measuring the temporal change in the pixel value of the pixel located at the center of the circle. The measurement unit 13 may also measure the time decay curve of the delayed fluorescence or phosphorescence of the object 100 by identifying an area on the image where the delayed fluorescence or phosphorescence of the object 100 is occurring and measuring the temporal change in an average value of the pixel values in the entire area. This allows the time decay curve of delayed fluorescence or phosphorescence to be measured with less effect of noise.

FIG. 7 is a diagram showing an image of the delayed fluorescence or phosphorescence of the object 100 captured by the substance identification device 10 according to the present embodiment. The pixel value of the pixel at the central coordinate being irradiated with excitation light in FIG. 6 is the pixel value in the second section B of the emission data L shown in FIG. 5.

The substance identification device 10 according to the present embodiment measures emission data for during and around irradiation with excitation light and measures the temporal change in brightness of delayed fluorescence or phosphorescence in the unit of ms, for example, as shown in FIGS. 3 to 5; it performs substance identification focusing on the fact that light accumulation time differs from substance to substance. By contrast, the technique described in Patent Literature 3, for example, captures images of delayed fluorescence with the exposure time of a camera being about 30 seconds and measures an integrated value of the brightness of delayed fluorescence. Thus, measuring of the temporal change in the brightness of delayed fluorescence or phosphorescence has not been focused in the conventional art and constitutes one of novel features in the present invention. The substance identification device 10 according to the present embodiment is able to identify the substance constituting the object 100 based on emission data related to the real-time temporal change in the delayed fluorescence or phosphorescence of the object 100, whereas the technique described in Patent Literature 3, for example, only measures an integrated value of the brightness of delayed fluorescence, being unable to identify a substance utilizing dynamic emission characteristics of the object. The substance identification device 10 according to the present embodiment is also capable of determining a two-dimensional position of delayed fluorescence or phosphorescence and measuring a time decay curve based on the temporal change of the position. That is, the substance identification device 10 according to the present embodiment can simultaneously identify the substance constituting the object 100 and the position of the object 100.

FIG. 8 is a diagram showing images of delayed fluorescence or phosphorescence of granulated sugar and corn starch captured by the substance identification device 10 according to the present embodiment. The figure shows images of delayed fluorescence or phosphorescence A of granulated sugar and delayed fluorescence or phosphorescence B of corn starch which are acquired by placing granulated sugar and corn starch, which are similar in appearance to the naked eye, side by side, applying excitation light to a boundary between them and capturing images at 10 ms, 20 ms, 30 ms, 40 ms, 50 ms and 60 ms after the irradiation. From the figure, it can be seen that the emission lifetime of the delayed fluorescence or phosphorescence A of granulated sugar is longer than the emission lifetime of the delayed fluorescence or phosphorescence B of corn starch.

For example, by storing the fact that the emission lifetime of granulated sugar is longer than the emission lifetime of corn starch as the emission data 14*b* for known substances, it is possible to determine that granulated sugar is placed on the left side in FIG. 8 and corn starch on the right side from the data shown in FIG. 8 even if placement of the granulated sugar and the corn starch is unknown. More particularly, if the emission lifetimes of multiple substances are stored as the emission data 14*b* for known substances, substances can be identified based on difference in emission lifetime even if substances other than granulated sugar and corn starch are distributed. Emission data for identifying a substance may also be feature values of the emission spectrum curve and the time decay curve, in addition to emission lifetime.

FIG. 9 is a diagram showing first emission data D1 measured by the substance identification device 10 according to the present embodiment. The first emission data D1 represents the emission spectrum curve of delayed fluorescence or phosphorescence which is measured from 0.1 ms to 1000 ms after irradiating the object 100 with excitation light having a wavelength of 375 nm. A timing of starting the measurement of delayed fluorescence or phosphorescence is not limited to 0.1 ms after irradiation with excitation light; it may be arbitrary like 0.01 ms after, 1 µs after, or 1 ms after the irradiation. A timing of ending the measurement of delayed fluorescence or phosphorescence is not limited to 1000 ms after irradiation with excitation light; it may be arbitrary like 100 ms after, 500 ms after, or 10 s after the irradiation. The figure shows wavelength on the horizontal axis in the unit of nm and emission intensity on the vertical axis in an arbitrary unit. The emission spectrum curve of the first emission data D1 is such that the emission intensity is at the maximum (called a main peak) at approximately 540 nm.

The identification unit 15 may identify the substance constituting the object 100 using a shape of the emission spectrum curve. In the case of this example, the emission spectrum curve is such that the emission intensity gently decreases in the region of wavelengths longer than 540 nm, the emission intensity gently decreases in the region of wavelengths shorter than 540 nm and then becomes substantially constant (called a shoulder peak) around 430 nm to 460 nm, and linearly decreases in the region of wavelengths shorter than 430 nm. The identification unit 15 may identify the substance constituting the object 100 by extracting such features of the shape of the emission spectrum curve and comparing them to the features of the shape of the emission spectrum curve for a known substance.

The identification unit 15 may identify the substance constituting the object 100 by using the wavelength that gives the maximum emission intensity (main peak) and a half width on the emission spectrum curve. In the case of this example, the emission spectrum curve is such that the wavelength that gives the maximum emission intensity (main peak) is about 540 nm and a half width HW thereof is about 140 nm (610 nm−470 nm=140 nm). Although in this example the full width at half maximum is used as the half width HW, the half width at half maximum may be used instead. The identification unit 15 may identify the substance constituting the object 100 by comparing the wavelength that gives the maximum emission intensity (main peak) and the half width measured for the object 100 with the wavelength that gives the maximum emission intensity (main peak) and the half width measured for a known substance.

The identification unit 15 may identify the substance constituting the object 100 by computing an emission intensity ratio for different wavelengths with respect to an emission spectrum curve which is acquired by irradiation with excitation light of a single wavelength. The identification unit 15 may identify the substance constituting the object 100 by comparing a ratio $I(\lambda 1)/I(\lambda 2)$ between an emission intensity $I(\lambda 1)$ at a first wavelength $\lambda 1$ and an emission intensity $I(\lambda 2)$ at a second wavelength $\lambda 2$ measured for the object 100 with an emission intensity ratio $I(\lambda 1)/I(\lambda 2)$ measured for a known substance.

FIG. 10 is a diagram showing a second emission data D2 and a third emission data D3 for an object measured by the substance identification device 10 according to the present embodiment. The second emission data D2 is a time decay curve for the emission intensity of delayed fluorescence or phosphorescence at a wavelength of 450 nm, which gives the maximum emission intensity, measured from 0.1 ms to 100 ms after irradiating the object 100 with excitation light having a wavelength of 375 nm. The third emission data D3 is a time decay curve for the emission intensity of delayed fluorescence or phosphorescence at a wavelength of 550 nm, which gives the maximum emission intensity, measured from 0.1 ms to 100 ms after irradiating the object 100 with excitation light having a wavelength of 375 nm. The figure shows the time elapsed from irradiation with excitation light in the unit of ms on the horizontal axis and emission intensity on the vertical axis in an arbitrary unit. The timing of starting the measurement of delayed fluorescence or phosphorescence is not limited to 0.1 ms after irradiation with excitation light; it may be arbitrary like 0.01 ms after, 1 µs after, 1 ms after the irradiation. The timing of ending the measurement of delayed fluorescence or phosphorescence is not limited to 100 ms after irradiation with excitation light; it may be arbitrary like 50 ms after, 500 ms after, or 1 s after the irradiation.

The figure also shows a second decay curve L2 approximating the time decay curve of the second emission data D2 and a third decay curve L3 approximating the time decay curve of the third emission data D3. The analysis unit 13*b* may approximate the time decay curve of emission intensity with $I(t)=I_0 \exp(-t/\tau)$ and determine $I_0$ and $\tau$ by the least squares method, for example. Here, $I_0$ is the emission intensity when the excitation stops, and time constant τ is the lifetime of delayed fluorescence or phosphorescence. The identification unit 15 may determine the substance constituting the object 100 using an emission lifetime computed from the time decay curve. The identification unit 15 may determine the substance constituting the object 100 by comparing a half-life τ/2 of light emission related to the object 100 with the half-life of light emission related to a known substance, for example. Generally, the analysis unit 13b may approximate the time decay curve of emission intensity with $I(t)=\Sigma_{j=1}^{N} I_j \exp(-t/\tau_j)$ and determine $I_j$ and $\tau_j$ by the least squares method, for example. Here, N is an integer equal to or greater than 1. In this manner, a time decay curve can be accurately approximated by approximating the time decay curve of emission intensity by superposition of multiple exponential functions.

The identification unit 15 may determine the substance constituting the object 100 by comparing emission lifetimes related to multiple wavelengths with the emission lifetimes at the same wavelengths related to a known substance, based on the time decay curves of emission intensity of delayed fluorescence or phosphorescence measured for different wavelengths.

FIG. 11 is a diagram showing a fourth emission data D4, a fifth emission data D5, a sixth emission data D6 and a seventh emission data D7 measured by the substance identification device 10 according to the present embodiment. The fourth emission data D4 represents the emission spectrum curve of delayed fluorescence or phosphorescence which is measured from 0.1 ms to 1000 ms after irradiating the object 100 with excitation light having a wavelength of 250 nm. The fifth emission data D5 represents the emission spectrum curve of delayed fluorescence or phosphorescence which is measured from 0.1 ms to 1000 ms after irradiating the object 100 with excitation light having a wavelength of 300 nm. The sixth emission data D6 represents the emission spectrum curve of delayed fluorescence or phosphorescence which is measured from 0.1 ms to 1000 ms after irradiating the object 100 with excitation light having a wavelength of 350 nm. The seventh emission data D7 represents the emission spectrum curve of delayed fluorescence or phosphorescence which is measured from 0.1 ms to 1000 ms after irradiating the object 100 with excitation light having a wavelength of 375 nm. The figure shows the wavelength on the horizontal axis in the unit of nm and emission intensity on the vertical axis in an arbitrary unit.

Comparing the emission spectrum curves of the fourth emission data D4, the fifth emission data D5, the sixth emission data and the seventh emission data, it can be seen that when the wavelength of excitation light is varied, the shape of the emission spectrum curve changes, the wavelength that gives the maximum emission intensity (main peak) and the half width on the emission spectrum curve change, and the emission intensity ratio for different wavelengths on the emission spectrum curves changes. In this manner, different substances can be distinguished with higher accuracy and the substance constituting the object 100 can be identified with high accuracy by measuring how the emission spectrum curve changes in response to a change in the irradiation condition of excitation light and comparing it with the change in the emission spectrum curve measured for a known substance under each irradiation condition.

FIG. 12 is a diagram showing an eighth emission data, a ninth emission data, a tenth emission data and an eleventh emission data measured by the substance identification device 10 according to the present embodiment. The eighth emission data D8 represents the time decay curve of emission intensity of delayed fluorescence or phosphorescence at 525 nm which is measured from 0.1 ms to 100 ms after irradiating the object 100 with excitation light having a wavelength of 250 nm. The ninth emission data D9 represents the time decay curve of emission intensity of delayed fluorescence or phosphorescence at 525 nm which is measured from 0.1 ms to 100 ms after irradiating the object 100 with excitation light having a wavelength of 300 nm. The tenth emission data D10 represents the time decay curve of emission intensity of delayed fluorescence or phosphorescence at 525 nm which is measured from 0.1 ms to 100 ms after irradiating the object 100 with excitation light having a wavelength of 350 nm. The eleventh emission data D11 represents the time decay curve of emission intensity of delayed fluorescence or phosphorescence at 525 nm which is measured from 0.1 ms to 100 ms after irradiating the object 100 with excitation light having a wavelength of 375 nm. The figure shows the time elapsed from irradiation with excitation light in the unit of ms on the horizontal axis and emission intensity on the vertical axis in an arbitrary unit.

The figure also shows an eighth decay curve L8 approximating the time decay curve of the eighth emission data D8, a ninth decay curve L9 approximating the time decay curve of the ninth emission data D9, a tenth decay curve L10 approximating the time decay curve of the tenth emission data D10, and an eleventh decay curve L11 approximating the time decay curve of the eleventh emission data D11. Comparing these data, it can be seen that when the wavelength of excitation light is varied, the shape of the time decay curve of emission intensity changes and the emission lifetime changes. In this manner, different substances can be distinguished with higher accuracy and the substance constituting the object 100 can be identified with high accuracy by measuring how the time decay curve of emission intensity changes in response to a change in the irradiation condition of excitation light and comparing it with the change in the time decay curve of emission intensity measured for a known substance under each irradiation condition. For example, the substance constituting the object 100 may be identified by determining half-lives of light emission for different irradiation conditions of excitation light and comparing them with the half-lives of light emission measured for known substances under similar irradiation conditions.

The substance identification device 10 according to the present embodiment can distinguish different substances using quantities that characterize the emission spectrum and the emission lifetime, and can identify the substance constituting the object 100 with high accuracy.

FIG. 13 is a flowchart of a substance identification process which is executed by the substance identification device 10 according to the present embodiment. First, the substance identification device 10 sets the irradiation condition of excitation light (S10). Then, the object 100 is irradiated with excitation light under the set irradiation condition (S11).

The substance identification device 10 uses the camera 13a to capture an image of the delayed fluorescence or phosphorescence of the object 100 which occurs in response to the irradiation with excitation light (S12). Then, the substance identification device 10 analyzes emission data for the delayed fluorescence or phosphorescence based on the captured image (S13). Here, the emission data may include the emission spectrum curve and the time decay curve of emission intensity.

The substance identification device 10 collates the resulting emission data with emission data for delayed fluorescence or phosphorescence which are measured when multiple substances are irradiated with excitation light under similar irradiation conditions (S14). Then, the substance identification device 10 identifies the substance constituting the object 100 based on similarity between the emission data (S15). The substance identification process then ends.

FIG. 14 is a diagram showing functional blocks of the substance identification device 10 according to a variant of the present embodiment. The substance identification device 10 according to the variant is different from the substance identification device 10 according to the present embodiment in that it includes a filter 13c for blocking light of the wavelength of excitation light. Otherwise, the substance identification device 10 according to the variant has a similar configuration as the substance identification device 10 according to the present embodiment.

The measurement unit 13 of the substance identification device 10 according to the variant measures emission data for delayed fluorescence or phosphorescence which has passed through the filter 13c, which blocks light of the wavelength of excitation light. This prevents excitation light from directly entering the camera 13a, so that emission data for delayed fluorescence or phosphorescence specific to a substance can be measured with high accuracy. The filter 13c can be capable of blocking light of multiple different wavelengths and switching the wavelength to be blocked. Where the object 100 is irradiated with excitation light of multiple different wavelengths by the irradiation unit 12, the filter 13c may apply a filter corresponding to each excitation wavelength in synchronization with the imaging timing of the camera 13a. In this case, the filter 13c may be formed from a liquid crystal or a rotating plate. By thus blocking light of multiple different wavelengths, emission data arising from excitation light of multiple different wavelengths can be measured with high accuracy by the camera 13a.

FIG. 15 is a diagram showing functional blocks of the substance identification device 10 according to a second variant of the present embodiment. The substance identification device 10 according to this variant is different from the substance identification device 10 according to the above embodiment in that it includes a machine learning unit 16. Otherwise, the substance identification device 10 according to this variant has a similar configuration as the substance identification device 10 according to the present embodiment. Although this example shows a case where the substance identification device 10 includes the machine learning unit 16, the function of the machine learning unit 16 may also be provided by other computer that can communicate with the substance identification device 10.

The machine learning unit 16 generates a learned model 14c for estimating the substance constituting the object based on emission data related to the object by machine learning using emission data for delayed fluorescence or phosphorescence related to known substances as learning data. The machine learning unit 16 may generate the learned model 14c by supervised learning using emission data and the substance constituting the object as learning data or may generate the learned model 14c by unsupervised learning using emission data as learning data, for example.

For the learning data, emission data may be used as it is or data generated by preprocessing of emission data may be used. Even in the case of using emission data as it is, feature points of the emission data may be extracted and used as learning data.

The identification unit 15 may identify the substance constituting the object based on an output of the learned model 14c in addition to the emission data 14a and the emission data 14b for known substances. In this manner, machine learning can be used to identify substances with reduced burden for extracting the feature values of the emission data 14a.

FIG. 16 is a flowchart of a learned model generation process which is executed by the substance identification device 10 according to the second variant of the present embodiment. First, the substance identification device 10 sets the irradiation condition of excitation light (S20). Then, an object whose constituent substance is known is irradiated with excitation light under the set irradiation condition (S21).

The substance identification device 10 uses the camera 13a to capture an image of delayed fluorescence or phosphorescence of the object which occurs in response to the irradiation with excitation light (S22). Then, the substance identification device 10 generates a learned model for estimating the substance constituting the object by machine learning using emission data for the delayed fluorescence or phosphorescence as learning data (S23). The generated learned model is stored in the storage unit 14. The learned model generation process then ends.

FIG. 17a shows a first example of a scatter diagram for emission data measured by the substance identification device 10 according to the present embodiment. The figure shows a brightness value of fluorescence on the horizontal axis and light accumulation time (the lifetime of light accumulation) on the vertical axis in the unit of milliseconds. Here, the brightness of fluorescence is the emission intensity of visible light that occurs when the object is irradiated with excitation light having a wavelength of about 300 nm. The light accumulation time (the lifetime of light accumulation) is the time from when the object is irradiated with excitation light and the irradiation is stopped to when delayed fluorescence or phosphorescence goes out. In the figure, after irradiating each object with excitation light at a random position and performing measurements on the object five times, emission data for a white word card (word card A) is indicated by a diamond, emission data for a white word card (word card B) is indicated by a square, emission data for a white word card (word card D) is indicated by a cross, emission data for white drawing paper (colored drawing paper) is indicated by an asterisk, emission data for white Kent paper is indicated by a circle, and emission data for a white milk carton is indicated by a plus sign.

According to the first example of a scatter diagram, emission data for the objects made from different substances are plotted in substantially different regions on a plane of fluorescence intensity and light accumulation time (the lifetime of light accumulation). Accordingly, using emission data for fluorescence intensity and light accumulation, for example, the constituent substance can be identified without destroying the object. For things that are different objects but have similar fluorescence intensities, identification of the substances constituting the objects is enabled by using emission data related to light accumulation.

The substance identification device 10 may include a filter that blocks ultraviolet and transmits visible light and may continuously measure fluorescence and light accumulation. The substance identification device 10 may also use light of a relatively long wavelength for measuring the lifetime of light accumulation and light of a relatively short wavelength for measuring fluorescence intensity. In addition to fluorescence and light accumulation, the substance identification device 10 may also measure reflected light and light accumulation or a physical quantity other than fluorescence and light accumulation, for example.

The substance identification device 10 may identify the substance constituting the object based on emission data related to fluorescence intensity and light accumulation lifetime using a learned model generated by machine learning, as described in the second variant.

The ability of the substance identification device 10 to identify the substance constituting the object can be applied to perform a quality check of an object or a forgery test.

FIG. 17*b* shows a second example of a scatter diagram for emission data measured by the substance identification device 10 according to the present embodiment. The figure shows the brightness value of fluorescence on the horizontal axis and light accumulation time (the lifetime of light accumulation) on the vertical axis in the unit of milliseconds. Here, the brightness of fluorescence is the emission intensity of visible light that occurs when the object is irradiated with excitation light having a wavelength of about 300 nm. The light accumulation time (the lifetime of light accumulation) is the time from when the object is irradiated with excitation light and the irradiation is stopped to when delayed fluorescence or phosphorescence goes out. In the figure, after performing measurements on each object five times, emission data for white fabric (Tepra α (polyester/silk texture)) is indicated by a diamond, emission data for white fabric (Cascot (acryl)) is indicated by a triangle, emission data for white fabric (Esumo (polyester and ultraviolet blocking properties)) is indicated by an asterisk, emission data for white fabric (XY-E (polyester/rayon texture)) is indicated by a square, and emission data for white fabric (Excesion (polyester/wool texture)) is indicated by a cross.

According to the second example of a scatter diagram, emission data for the objects made from different substances are plotted in substantially different regions on a plane of fluorescence intensity and light accumulation time (the lifetime of light accumulation). Accordingly, using emission data for fluorescence intensity and light accumulation for example, the constituent substance can be identified without destroying the object. For things that are different objects but have similar fluorescence intensities, identification of the substances constituting the objects is enabled by using emission data related to light accumulation.

FIG. 17*c* shows a third example of a scatter diagram for emission data measured by the substance identification device 10 according to the present embodiment. The figure shows the brightness value of fluorescence on the horizontal axis and light accumulation time (the lifetime of light accumulation) on the vertical axis in the unit of milliseconds. Here, the brightness of fluorescence is the emission intensity of visible light that occurs when the object is irradiated with excitation light having a wavelength of about 300 nm. The light accumulation time (the lifetime of light accumulation) is the time from when the object is irradiated with excitation light and the irradiation is stopped to when delayed fluorescence or phosphorescence goes out. In the figure, after performing measurements on each object five times, emission data for white rubber (a rubber glove) is indicated by a diamond, emission data for white rubber (Togawa rubber) is indicated by a square, and emission data for white rubber (recycled rubber) is indicated by a triangle.

According to the third example of a scatter diagram, emission data for the objects made from different substances are plotted in substantially different regions on a plane of fluorescence intensity and light accumulation time (the lifetime of light accumulation). Accordingly, using emission data for fluorescence intensity and light accumulation for example, the constituent substance can be identified without destroying the object. For things that are different objects but have similar fluorescence intensities, identification of the substances constituting the objects is enabled by using emission data related to light accumulation.

FIG. 17*d* shows a fourth example of a scatter diagram for emission data measured by the substance identification device 10 according to the present embodiment. The figure shows the brightness value of fluorescence on the horizontal axis and light accumulation time (the lifetime of light accumulation) on the vertical axis in the unit of milliseconds. Here, the brightness of fluorescence is the emission intensity of visible light that occurs when the object is irradiated with excitation light having a wavelength of about 300 nm. The light accumulation time (the lifetime of light accumulation) is the time from when the object is irradiated with excitation light and the irradiation is stopped to when delayed fluorescence or phosphorescence goes out. In the figure, after performing measurements on each object five times, emission data for gray mortar (mortar A) is indicated by a diamond, emission data for gray concrete is indicated by a square, and emission data for gray mortar (mortar B) is indicated by a triangle.

According to the fourth example of a scatter diagram, emission data for objects that are different in the proportions of constituent substances are plotted in substantially different regions on a plane of fluorescence intensity and light accumulation time (the lifetime of light accumulation). Accordingly, using emission data for fluorescence intensity and light accumulation for example, it can be determined that objects are different in the proportions of the constituent substances without destroying the objects. For things that are objects different in the proportions of the constituent substances but have similar fluorescence intensities, it can be determined that the proportions of the substances constituting the objects are different by using emission data related to light accumulation.

FIG. 17*e* shows a fifth example of a scatter diagram for emission data measured by the substance identification device 10 according to the present embodiment. The figure shows the brightness value of fluorescence on the horizontal axis and light accumulation time (the lifetime of light accumulation) on the vertical axis in the unit of milliseconds. Here, the brightness of fluorescence is the emission intensity of visible light that occurs when the object is irradiated with excitation light having a wavelength of about 300 nm. The light accumulation time (the lifetime of light accumulation) is the time from when the object is irradiated with excitation light and the irradiation is stopped to when delayed fluorescence or phosphorescence goes out. In the figure, for a single measurement on each object, emission data for a steel plate (Fe), emission data for granulated zinc (Zn), emission data for granulated gold (Au), emission data for granulated copper (Cu), and emission data for granulated aluminum (Al) are indicated by diamonds, respectively.

According to the fifth example of a scatter diagram, emission data for different metals are plotted in substantially different regions on a plane of fluorescence intensity and light accumulation time (the lifetime of light accumulation). Accordingly, using emission data for fluorescence intensity and light accumulation for example, metal(s) contained in the object can be identified without destroying the object. For things that are different objects but have similar fluorescence intensities, identification of the substances constituting the objects is enabled by using emission data related to light accumulation.

FIG. 18 is a diagram showing emission data measured with varying irradiation times of excitation light by the substance identification device 10 according to the present embodiment. In the figure, with excitation light of a constant wavelength, emission data D21 for irradiation with the same for 300 ms is indicated by a solid line, emission data D22 for irradiation with the same for 500 ms is indicated by a dot-dashed line, emission data D23 for irradiation with the same for 700 ms is indicated by a double-dot dashed line, and emission data D24 for irradiation with the same for 900 ms is indicated by a broken line.

From the emission data D21 and the emission data D22, it can be ascertained that increasing the irradiation time of excitation light results in a longer emission lifetime of delayed fluorescence or phosphorescence. From the emission data D23 and the emission data D24 on the other hand, it can be ascertained that increasing the irradiation time of excitation light does not result in a longer emission lifetime of delayed fluorescence or phosphorescence but saturation of the emission lifetime. In the case of this example, the emission lifetime hardly changes with an irradiation time of 700 ms or longer.

FIG. 19 is a diagram showing emission data D31, which is measured when a sketchbook is irradiated with excitation light by the substance identification device 10 according to the present embodiment. FIG. 20 shows emission data D32, which is measured when a milk carton is irradiated with excitation light by the substance identification device 10 according to the present embodiment. In FIGS. 19 and 20, in terms of the pixel value, a broken line is indicated at a line of 50% with respect to the maximum and a dot-dashed line is indicated at a line of 10% with respect to the maximum.

According to FIG. 19, for the emission data D31 of a sketchbook, the time at which the pixel value is 50% is 20 ms and the time at which the pixel value is 10% is 135 ms. Here, the time at which the pixel value is 10% divided by the time at which the pixel value is 50% is 6.75.

According to FIG. 20, for the emission data D32 of a milk carton, the time at which the pixel value is 50% is 45 ms and the time at which the pixel value is 10% is 255 ms. Here, the time at which the pixel value is 10% divided by the time at which the pixel value is 50% is 5.7.

The substance identification device 10 measures the time decay of emission intensity of delayed fluorescence or phosphorescence for various objects and stores the time at which their emission intensity is 10% divided by the time at which their emission intensity is 50% (a ratio between times of time decay), for example, in the storage unit 14. Then, the substance identification device 10 measures the delayed fluorescence or phosphorescence for an object whose constituent substance is unknown, and compares its ratio between times of time decay with a value for a known substance to identify the substance constituting the object. However, the substance identification device 10 may compute any feature value to identify a substance in addition to the ratio between times of time decay of emission intensity.

FIG. 21 is a diagram showing a time decay curve D40 which is measured when a sketchbook is irradiated with excitation light by the substance identification device 10 according to the present embodiment and a decay curve D41 approximating it. In the figure, the pixel value representing a captured light emission image of delayed fluorescence or phosphorescence is indicated on the vertical axis, and time represented by the number of frames (Time (Frame No.)) is indicated on the horizontal axis.

The decay curve D41 in this example is a superposition of a first decay curve D42 and a second decay curve D43. Specifically, the first decay curve D42 is a functional curve of $I_1 \exp(-t/\tau_1)$, where $I_1=506$ and $\tau_1=0.2583$. The second decay curve D43 is a functional curve of $I_2 \exp(-t/\tau_2)$, where $I_2=82$ and $\tau_2=0.0022$. The decay curve D41 is a functional curve of $\Sigma_{j=1}^{2} I_j \exp(-t/\tau_j)$. Here, $I_1$, $I_2$, $\tau_1$ and $\tau_2$ may be determined by the least squares method, for example. In this manner, the time decay curve of emission intensity can be approximated accurately by approximating the time decay curve via superposition of multiple exponential functions.

FIG. 22 is a diagram showing an image of the delayed fluorescence or phosphorescence of a milk carton captured by the substance identification device 10 according to the present embodiment. The figure shows an image of delayed fluorescence or phosphorescence which is captured with the object 100 placed relatively far (specifically, located 4 m apart) from the camera 13a and the irradiation unit 12. Although due to the placement of the camera 13a relatively far from the object 100, apparent light accumulation intensity is weaker than when the camera 13a is placed relatively close to the object 100, light accumulation with a lifetime of about 120 ms is observed.

The above-described embodiment is intended for facilitating understanding of the present invention and is not intended for interpreting the present invention in a limited manner. The elements included in the embodiment and their arrangement, materials, conditions, shapes, sizes, etc. are not limited to the illustrated ones but can be modified as necessary. It is also possible to partially replace or combine components that are shown in different embodiments.

In a case where delayed fluorescence or phosphorescence occurs on a certain face of the object 100 to a similar degree, the substance identification device 10 can also irradiate multiple spots on the object 100 with excitation light of different wavelengths and measure distances from the camera 13a to the multiple irradiation positions by utilizing the fact that a time difference occurs in delayed fluorescence or phosphorescence depending on the distance from the camera 13a to the irradiation position.

The substance identification device 10 may also include an irradiation unit 12 that can adjust the intensity of irradiation light per unit area or vary an area of irradiation by enabling an irradiation range of excitation light to be varied via a variable focal point or an active lens, for example.

The present embodiment showed an example where emitted light is assumed to be emitted from the object 100 to the irradiation unit 12 side and the camera 13a is disposed on the irradiation unit 12 side. In contrast, where the object 100 is a light transmissive substance and the intensity of emitted light is greater than on the transmitted light side than on the irradiation unit 12 side due to transmission of emitted light through the object 100, the camera 13a may be disposed on the transmitted light side.

The irradiation unit 12 of the substance identification device 10 may also apply pulsed irradiation light multiple times intermittently. In doing so, an emission duration of delayed fluorescence or phosphorescence may be longer than an exit interval of irradiation light. That is, an irradiation interval of the pulsed irradiation light may be shorter than the lifetime of delayed fluorescence or phosphorescence.

REFERENCE SIGNS LIST 10 substance identification device
10a CPU
10b RAM
10c ROM
10d communication unit
10e input unit
10f display unit 11 setting unit
12 irradiation unit
13 measurement unit
13a camera
13b analysis unit
14 storage unit
14a emission data
14b emission data for known substances
15 identification unit
16 machine learning unit
100 object

The invention claimed is:

1. A substance identification device comprising:
a setting unit that sets an irradiation condition of excitation light;
an irradiation unit that irradiates an object with the excitation light under the irradiation condition;
a measurement unit that measures emission data for delayed fluorescence or phosphorescence of the object which occurs in response to the irradiation with the excitation light; and
an identification unit that identifies a substance constituting the object based on the emission data and emission data for delayed fluorescence or phosphorescence which are measured when a plurality of substances are each irradiated with the excitation light under the irradiation condition,
wherein the emission data comprises a time decay curve of emission intensity, and
wherein the measurement unit consecutively captures images of the delayed fluorescence or the phosphorescence and measures the time decay curve based on a temporal change in a pixel value for the delayed fluorescence or the phosphorescence.

2. The substance identification device according to claim 1, wherein the irradiation unit includes one or more light sources for producing the excitation light of a plurality of different wavelengths.

3. The substance identification device according to claim 1, wherein the irradiation condition includes at least any of a wavelength of the excitation light, an intensity of the excitation light and an irradiation time of the excitation light.

4. The substance identification device according to claim 1, wherein a wavelength of the excitation light is between 250-375 nm.

5. The substance identification device according to claim 1, wherein the emission data includes emission data for delayed fluorescence or phosphorescence that occurs after irradiation with the excitation light is stopped.

6. The substance identification device according to claim 1, wherein the measurement unit measures the emission data for the delayed fluorescence or the phosphorescence which has passed through a filter that blocks light of a wavelength of the excitation light.

7. The substance identification device according to claim 1, wherein the emission data comprises i) the time decay curve of emission intensity, or ii) the time decay curve of emission intensity and an emission spectrum curve.

8. The substance identification device according to claim 7, wherein,
for the emission data being the time decay curve of emission intensity, the identification unit identifies the substance constituting the object using an emission lifetime computed from the time decay curve; and
for the emission data being comprised of the time decay curve of emission intensity and the emission spectrum curve, the identification unit identifies the substance constituting the object using at least any of a shape of the emission spectrum curve, a wavelength that gives a maximum emission intensity and a half width on the emission spectrum curve, an emission intensity ratio for different wavelengths on the emission spectrum curve, and an emission lifetime computed from the time decay curve.

9. The substance identification device according to claim 1, wherein the measurement unit comprises a high-speed camera that captures images of the delayed fluorescence or the phosphorescence at a frame rate of 100 fps or higher.

10. The substance identification device according to claim 9, wherein the measurement unit comprises a camera that captures images of the delayed fluorescence or the phosphorescence at a frame rate lower than 100 fps and the high-speed camera, such that the delayed fluorescence or the phosphorescence in a period with relatively rapid temporal change is captured with the high-speed camera and the delayed fluorescence or the phosphorescence in a period with relatively slow temporal change is captured with the camera.

11. The substance identification device according to claim 1, wherein the measurement unit measures the emission data including data related to fluorescence of the object which occurs during irradiation with the excitation light.

12. The substance identification device according to claim 1, further comprising a machine learning unit that generates a learned model for estimating the substance constituting the object based on the emission data related to the object by machine learning using emission data for delayed fluorescence or phosphorescence related to known substances as learning data.

13. A substance identification method comprising:
setting an irradiation condition of excitation light;
irradiating an object with the excitation light under the irradiation condition;
measuring emission data for delayed fluorescence or phosphorescence of the object which occurs in response to the irradiation with the excitation light; and
identifying a substance constituting the object based on the emission data and emission data for delayed fluorescence or phosphorescence which are measured when a plurality of substances are each irradiated with the excitation light under the irradiation condition,
wherein the emission data comprises a time decay curve of emission intensity, and
wherein measuring the emission data comprises consecutively capturing images of the delayed fluorescence or the phosphorescence and measuring the time decay curve based on a temporal change in a pixel value for the delayed fluorescence or the phosphorescence.

14. A substance identification device comprising:
a setting unit that sets an irradiation condition of excitation light;
an irradiation unit that irradiates an object with the excitation light under the irradiation condition;
a measurement unit that measures emission data related to light emission of the object which occurs with a delay relative to irradiation with the excitation light; and
an identification unit that identifies a substance constituting the object based on the emission data and emission data related to light emission which occurs with a delay when a plurality of substances are each irradiated with the excitation light under the irradiation condition,
wherein the emission data comprises a time decay curve of emission intensity, and wherein the measurement unit consecutively captures images of the light emission of the object which occurs with a delay relative to irradiation with the excitation light, and measures the time decay curve based on a temporal change in a pixel value for the light emission.

15. A substance identification device comprising:
a setting unit that sets an irradiation condition of excitation light;
an irradiation unit that irradiates an object with the excitation light under the irradiation condition;
a measurement unit that measures emission data for delayed fluorescence or phosphorescence of the object which occurs in response to the irradiation with the excitation light; and
an identification unit that identifies a substance constituting the object based on the emission data and emission data for delayed fluorescence or phosphorescence which are measured when a plurality of substances are each irradiated with the excitation light under the irradiation condition,
wherein the measurement unit comprises a high-speed camera that captures images of the delayed fluorescence or the phosphorescence at a frame rate of 100 fps or higher.

16. A substance identification method comprising:
setting an irradiation condition of excitation light;
irradiating an object with the excitation light under the irradiation condition;
measuring emission data for delayed fluorescence or phosphorescence of the object which occurs in response to the irradiation with the excitation light; and
identifying a substance constituting the object based on the emission data and emission data for delayed fluorescence or phosphorescence which are measured when a plurality of substances are each irradiated with the excitation light under the irradiation condition,
wherein measuring the emission data comprises capturing images of the delayed fluorescence or the phosphorescence at a frame rate of 100 fps or higher using a high-speed camera.

17. A substance identification device comprising:
a setting unit that sets an irradiation condition of excitation light;
an irradiation unit that irradiates an object with the excitation light under the irradiation condition;
a measurement unit that measures emission data related to light emission of the object which occurs with a delay relative to irradiation with the excitation light; and
an identification unit that identifies a substance constituting the object based on the emission data and emission data related to light emission which occurs with a delay when a plurality of substances are each irradiated with the excitation light under the irradiation condition,
wherein the measurement unit comprises a high-speed camera that captures images of the light emission of the object at a frame rate of 100 fps or higher.

* * * * *